US011979184B2

United States Patent
Takezono

(10) Patent No.: US 11,979,184 B2
(45) Date of Patent: May 7, 2024

(54) RADIO-FREQUENCY SIGNAL TRANSMITTING/RECEIVING CIRCUIT

(71) Applicant: Murata Manufacturing Co., Ltd., Kyoto (JP)

(72) Inventor: Naofumi Takezono, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 381 days.

(21) Appl. No.: 17/453,904

(22) Filed: Nov. 8, 2021

(65) Prior Publication Data

US 2022/0149883 A1    May 12, 2022

(30) Foreign Application Priority Data

Nov. 9, 2020   (JP) ................ 2020-186703

(51) Int. Cl.
*H04L 5/14*   (2006.01)
*H04B 1/40*   (2015.01)

(52) U.S. Cl.
CPC ........... *H04B 1/40* (2013.01); *H04L 5/14* (2013.01)

(58) Field of Classification Search
CPC .............. H04L 5/14; H04L 12/28; H04B 1/40
USPC .................................. 370/329, 400, 403
See application file for complete search history.

(56) References Cited

U.S. PATENT DOCUMENTS

| 2011/0134810 A1 | 6/2011 | Yamamoto et al. |
| 2014/0328222 A1 | 11/2014 | Mao et al. |
| 2019/0372610 A1* | 12/2019 | Choi ............ H04B 1/10 |

FOREIGN PATENT DOCUMENTS

| CN | 102571655 A | 7/2012 |
| JP | H11-308143 A | 11/1999 |
| JP | 2003-179251 A | 6/2003 |
| JP | 2011-120120 A | 6/2011 |

* cited by examiner

*Primary Examiner* — Dang T Ton
(74) *Attorney, Agent, or Firm* — Pearne & Gordon LLP

(57) ABSTRACT

An RF signal transmitting/receiving circuit includes: at least one power amplifier circuit that amplifies and outputs an RF transmission signal; duplexers each including a transmission filter that passes the RF transmission signal amplified by the power amplifier circuit, and a reception filter that passes an RF reception signal; at least one distribution circuit that divides the RF transmission signal input to the power amplifier circuit and outputs a first signal; a signal output circuit that outputs, based on the first signal, in at least one transmission path among transmission paths of a plurality of the RF reception signals, at least one second signal that has substantially a same delay amount, an inverted phase, and substantially same power as the RF transmission signal mixed in the RF reception signal; and coupling circuits that couple the second signal to the RF reception signal transmitted in the at least one transmission path.

7 Claims, 9 Drawing Sheets

RADIO-FREQUENCY SIGNAL TRANSMITTING/RECEIVING CIRCUIT

CROSS REFERENCE TO RELATED APPLICATION

This application claims priority from Japanese Patent Application No. 2020-186703 filed on Nov. 9, 2020. The content of this application is incorporated herein by reference in its entirety.

BACKGROUND

The present disclosure relates to a radio-frequency (RF) signal transmitting/receiving circuit.

Japanese Unexamined Patent Application Publication (JP-A) No. 2003-179521 describes a semiconductor device that cancels out a leakage signal from a high power amplifier to a reception channel. Other related technology is described in, for example, JP-A Nos. 2011-120120 and H11-308143.

Recently, an RF signal transmitting/receiving circuit includes multiple reception paths for performing reception in multiple bands. However, with the semiconductor device described in JP-A No. 2003-179521, a transmission signal mixed in multiple reception paths may not be suppressed.

BRIEF SUMMARY

The present disclosure suppresses an RF transmission signal mixed in multiple reception paths.

According to embodiments of the present disclosure, a radio-frequency signal transmitting/receiving circuit includes: at least one power amplifier circuit that amplifies and outputs a radio-frequency transmission signal; duplexers each including a transmission filter that passes the radio-frequency transmission signal amplified by the power amplifier circuit, and a reception filter that passes a radio-frequency reception signal; at least one distribution circuit that divides the radio-frequency transmission signal input to the power amplifier circuit and outputs a first signal; a signal output circuit that outputs, based on the first signal, in at least one transmission path among transmission paths of a plurality of the radio-frequency reception signals, at least one second signal that has substantially a same delay amount, an inverted phase, and substantially same power as the radio-frequency transmission signal mixed in the radio-frequency reception signal; and coupling circuits that couple the second signal to the radio-frequency reception signal transmitted in the at least one transmission path.

According to the present disclosure, an RF transmission signal mixed in multiple reception paths may be suppressed.

Other features, elements, characteristics and advantages of the present disclosure will become more apparent from the following detailed description of embodiments of the present disclosure with reference to the attached drawings.

DETAILED DESCRIPTION

Hereinafter, an RF signal transmitting/receiving circuit according to embodiments of the present disclosure will be described on the basis of the drawings. Note that the present disclosure is not limited by these embodiments. Each embodiment is an illustrative example and, needless to say, configurations illustrated in different embodiments may be partially replaced or combined with each other. From a second embodiment onward, descriptions of matters common to a first embodiment will be omitted, and only different points will be described. In particular, the same or similar advantageous effects achieved by the same or similar configurations will not be mentioned one by one in each embodiment.

First Embodiment

Circuit Configuration

Figure 1:
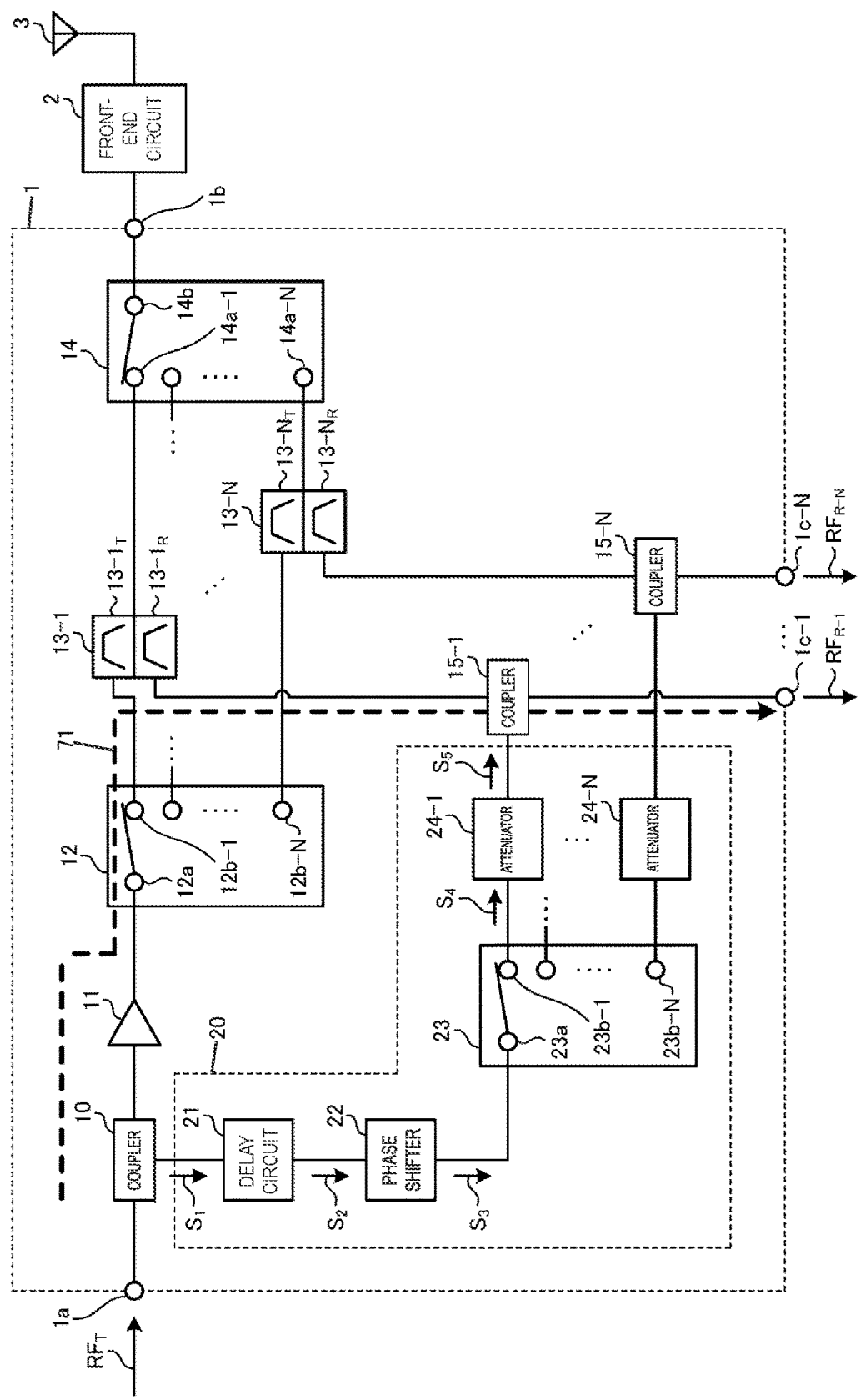
FIG. 1 is a diagram illustrating the configuration of an RF signal transmitting/receiving circuit according to a first embodiment.

FIG. 1 is a diagram illustrating the configuration of an RF signal transmitting/receiving circuit according to the first embodiment. An RF signal transmitting/receiving circuit 1 is an RF signal transmitting/receiving module capable of outputting an RF transmission signal $RF_T$ via a front-end circuit 2 to an antenna 3 and receiving RF reception signals $RF_{R-1}$ to $RF_{R-N}$ via the front-end circuit 2 from the antenna 3 in a mobile communication apparatus exemplified by a cellular phone. The RF signal transmitting/receiving module may be configured by mounting one or more components on a substrate.

The frequencies of the RF transmission signal $RF_T$ and the RF reception signals $RF_{R-1}$ to $RF_{R-N}$ are exemplified by about several hundred megahertz (MHz) to several tens of gigahertz (GHz), but the present disclosure is not limited to these frequencies.

The RF signal transmitting/receiving circuit 1 performs frequency division duplex (FDD).

The RF signal transmitting/receiving circuit 1 includes a coupler 10, a power amplifier circuit 11, switches 12 and 14, duplexers 13-1 to 13-N (N is a natural number greater than or equal to 2), couplers 15-1 to 15-N, and a signal output circuit 20. The signal output circuit 20 includes a delay circuit 21, a phase shifter 22, a switch 23, and attenuators 24-1 to 24-N.

The coupler 10 corresponds to an example of a "distribution circuit" of the present disclosure. Each of the couplers 15-1 to 15-N corresponds to an example of a "coupling circuit" of the present disclosure.

The duplexer 13-1 includes a transmission filter $13\text{-}1_T$, which passes the RF transmission signal $RF_T$, and a reception filter $13\text{-}1_R$, which passes the RF reception signal $RF_{R\text{-}1}$. The duplexer 13-N includes a transmission filter $13\text{-}N_T$, which passes the RF transmission signal $RF_T$, and a reception filter $13\text{-}N_R$, which passes the RF reception signal $RF_{R\text{-}N}$.

Although each of the transmission filters $13\text{-}1_T$ to $13\text{-}N_T$ and the reception filters $13\text{-}1_R$ to $13\text{-}N_R$ is a band pass filter in the first embodiment, the present disclosure is not limited thereto. Each of the transmission filters $13\text{-}1_T$ to $13\text{-}N_T$ and the reception filters $13\text{-}1_R$ to $13\text{-}N_R$ may be a low pass filter, a high pass filter, or a notch filter (band elimination filter).

An RF transmission signal and an RF reception signal passed by each of the duplexers 13-1 to 13-N may have different frequencies or the same frequency.

In the first embodiment, it is assumed that the transmission filter $13\text{-}1_T$ band-passes, for example, the RF transmission signal $RF_T$ in band 1 of Long Term Evolution (LTE). It is assumed that the reception filter $13\text{-}1_R$ band-passes the RF reception signal $RF_{R\text{-}1}$ in band 1 of LTE. It is assumed that the transmission filter $13\text{-}N_T$ band-passes the RF transmission signal $RF_T$ in band 3 of LTE. It is assumed that the reception filter $13\text{-}N_R$ band-passes the RF reception signal $RF_{R\text{-}N}$ in band 3 of LTE.

The switch 12 includes a first terminal 12a and second terminals 12b-1 to 12b-N.

The first terminal 12a of the switch 12 is electrically coupled to an output terminal of the power amplifier circuit 11. The second terminals 12b-1 to 12b-N of the switch 12 are electrically coupled to the transmission filters $13\text{-}1_T$ to $13\text{-}N_T$, respectively.

First ends of the reception filters $13\text{-}1_R$ to $13\text{-}N_R$ are electrically coupled to output terminals 1c-1 to 1c-N, respectively, with the couplers 15-1 to 15-N interposed therebetween.

The switch 14 includes first terminals 14a-1 to 14a-N and a second terminal 14b. The first terminals 14a-1 to 14a-N of the switch 14 are electrically coupled to second ends of the duplexers 13-1 to 13-N, respectively.

The second terminal 14b of the switch 14 is electrically coupled to the front-end circuit 2 with an input/output terminal 1b interposed therebetween.

RF Signal Transmitting/Receiving Operation

The RF transmission signal $RF_T$ is input to the power amplifier circuit 11 via an input terminal 1a and the coupler 10. The power amplifier circuit 11 amplifies the RF transmission signal $RF_T$ and outputs the amplified signal to the first terminal 12a of the switch 12.

The switch 12 electrically couples the first terminal 12a and any of the second terminals 12b-1 to 12b-N.

In the case illustrated in FIG. 1 (hereinafter referred to as a "first case"), the RF transmission signal $RF_T$ is an RF transmission signal in band 1 of LTE, and the state where the switch 12 electrically couples the first terminal 12a and the second terminal 12b-1 is illustrated.

The switch 14 electrically couples any of the first terminals 14a-1 to 14a-N and the second terminal 14b.

In the first case, the RF transmission signal $RF_T$ is an RF transmission signal in band 1 of LTE, the RF reception signal $RF_{R\text{-}1}$ is an RF reception signal in band 1 of LTE, and the state where the switch 14 electrically couples the first terminal 14a-1 and the second terminal 14b is illustrated.

In the first case, the RF transmission signal $RF_T$ is amplified by the power amplifier circuit 11, is band-passed by the transmission filter $13\text{-}1_T$ via the first terminal 12a and the second terminal 12b-1, and is transmitted to the antenna 3 via the first terminal 14a-1, the second terminal 14b, and the front-end circuit 2.

Also, in the first case, the RF reception signal $RF_{R\text{-}1}$ input from the front-end circuit 2 is band-passed by the reception filter $13\text{-}1_R$ via the second terminal 14b and the first terminal 14a-1, and is output from the output terminal 1c-1 via the coupler 15-1.

At this time, it is ideally desirable that there be isolation between the transmission filter $13\text{-}1_T$ and the reception filter $13\text{-}1_R$, and the RF transmission signal $RF_T$ be not mixed in the RF reception signal $RF_{R\text{-}1}$. In reality, however, it is difficult to completely have isolation between the transmission filter $13\text{-}1_T$ and the reception filter $13\text{-}1_R$. Therefore, as indicated by arrow 71, the RF transmission signal $RF_T$ is mixed in the RF reception signal $RF_{R\text{-}1}$ after going through the power amplifier circuit 11, the switch 12, the transmission filter $13\text{-}1_T$, the reception filter $13\text{-}1_R$, and the output terminal 1c-1.

In FDD, transmission and reception are simultaneously performed in one band. For example, the transmission filter $13\text{-}1_T$ band-passes the RF transmission signal $RF_T$, and the reception filter $13\text{-}1_R$ band-passes the RF reception signal $RF_{R\text{-}1}$. However, in downlink carrier aggregation (DL CA), there is a band where only reception is performed without performing transmission. For example, the transmission filter $13\text{-}N_T$ does not band-pass the RF transmission signal $RF_T$, and the reception filter $13\text{-}N_R$ band-passes the RF reception signal $RF_{R\text{-}N}$. In this case, the switch 14 electrically couples the second terminal 14b and the first terminal 14a-1, and also electrically couples the second terminal 14b and the first terminal 14a-N. At this time, because the first terminal 12a and the second terminal 12b-N are not electrically coupled to each other, the RF transmission signal $RF_T$ is not mixed in the RF reception signal $RF_{R\text{-}N}$.

Figure 2:
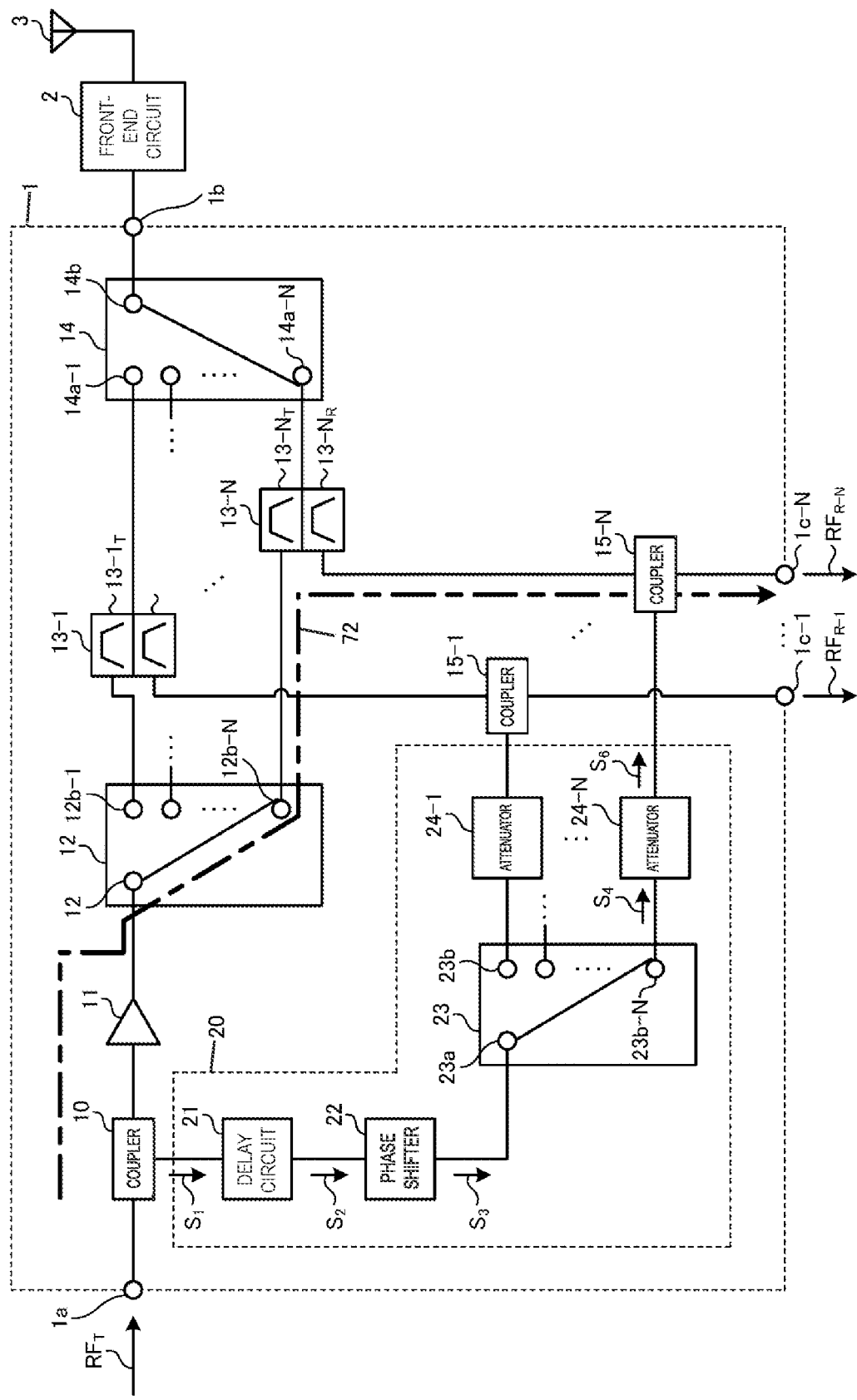
FIG. 2 is a diagram illustrating the configuration of the RF signal transmitting/receiving circuit according to the first embodiment.

FIG. 2 is a diagram illustrating the configuration of the RF signal transmitting/receiving circuit according to the first embodiment. In the case illustrated in FIG. 2 (hereinafter referred to as a "second case"), the switch 12 electrically couples the first terminal 12a and the second terminal 12b-N, and the switch 14 electrically couples the first terminal 14a-N and the second terminal 14b.

In the second case, the RF transmission signal $RF_T$ is an RF transmission signal in band 3 of LTE, and the state where the switch 12 electrically couples the first terminal 12a and the second terminal 12b-N is illustrated.

In the second case, the RF transmission signal $RF_T$ is amplified by the power amplifier circuit 11, is band-passed by the transmission filter $13\text{-}N_T$ via the first terminal 12a and the second terminal 12b-N, and is transmitted to the antenna 3 via the first terminal 14a-N, the second terminal 14b, and the front-end circuit 2.

Also, in the second case, the RF reception signal $RF_{R\text{-}N}$ input from the front-end circuit 2 is band-passed by the reception filter $13\text{-}N_R$ via the second terminal 14b and the first terminal 14a-N, and is output from the output terminal 1c-N via the coupler 15-N.

At this time, it is ideally desirable that there be isolation between the transmission filter $13\text{-}N_T$ and the reception filter $13\text{-}N_R$, and the RF transmission signal $RF_T$ be not mixed in the RF reception signal $RF_{R\text{-}N}$. In reality, however, it is difficult to completely have isolation between the transmission filter $13\text{-}N_T$ and the reception filter $13\text{-}N_R$. Therefore, as indicated by arrow 72, the RF transmission signal $RF_T$ is mixed in the RF reception signal $RF_{R-N}$ after going through the power amplifier circuit 11, the switch 12, the transmission filter 13-$N_T$, the reception filter 13-$N_R$, and the output terminal 1c-N.

In DL CA, for example, the transmission filter 13-$1_T$ does not band-pass the RF transmission signal $RF_T$, and the reception filter 13-$1_R$ band-passes the RF reception signal $RF_{R-1}$. In this case, the switch 14 electrically couples the second terminal 14b and the first terminal 14a-N, and also electrically couples the second terminal 14b and the first terminal 14a-1. At this time, because the first terminal 12a and the second terminal 12b-1 are not electrically coupled to each other, the RF transmission signal $RF_T$ is not mixed in the RF reception signal $RF_{R-1}$.

Operation of Signal Output Circuit
First Case

Referring again to FIG. 1, the signal output circuit 20 includes the delay circuit 21, the phase shifter 22, the switch 23, and the attenuators 24-1 to 24-N.

The attenuators 24-1 to 24-N correspond to an example of an "attenuation circuit" of the present disclosure.

The switch 23 includes a first terminal 23a and second terminals 23b-1 to 23b-N. The first terminal 23a of the switch 23 is electrically coupled to the phase shifter 22. The second terminal 23b-1 of the switch 23 is electrically coupled to the attenuator 24-1. The second terminal 23b-N of the switch 23 is electrically coupled to the attenuator 24-N.

The coupler 10 divides the RF transmission signal $RF_T$ into two, and outputs one RF transmission signal $RF_T$ to the power amplifier circuit 11 and the other signal $S_1$ to the delay circuit 21. The signal $S_1$ is a signal with the same waveform as the RF transmission signal $RF_T$ but with smaller power.

In the first, second, fifth, and sixth embodiments, the signal $S_1$ corresponds to an example of a "first signal" of the present disclosure.

The delay circuit 21 outputs a signal $S_2$, which is obtained by delaying the signal $S_1$ by a predetermined delay time, to the phase shifter 22.

In the first, second, fifth, and sixth embodiments, the signal $S_2$ corresponds to an example of a "third signal" of the present disclosure.

Note that the predetermined delay time of the delay circuit 21 is a value obtained by subtracting the sum of the delay times of the coupler 10, the phase shifter 22, the switch 23, the attenuator 24-1, and the coupler 15-1 from the sum of the delay times of the coupler 10, the power amplifier circuit 11, the switch 12, the duplexer 13-1, and the coupler 15-1. Accordingly, in the transmission path of the RF reception signal $RF_{R-1}$ of the coupler 15-1, the delay of the RF transmission signal $RF_T$ mixed in the RF reception signal $RF_{R-1}$ becomes the same as the delay of a signal $S_5$ input from the attenuator 24-1 to the coupler 15-1.

The phase shifter 22 outputs a signal $S_3$, which is obtained by shifting the phase of the signal $S_2$ by a predetermined phase shift amount, to the first terminal 23a of the switch 23.

In the first, second, fifth, and sixth embodiments, the signal $S_3$ corresponds to an example of a "fourth signal" of the present disclosure.

Note that the predetermined phase shift amount of the phase shifter 22 is a value obtained by subtracting the sum of the phase shift amounts of the coupler 10, the delay circuit 21, the switch 23, the attenuator 24-1, and the coupler 15-1 from a value obtained by adding 180° to the sum of the phase shift amounts of the coupler 10, the power amplifier circuit 11, the switch 12, the duplexer 13-1, and the coupler 15-1. Accordingly, in the transmission path of the RF reception signal $RF_{R-1}$ of the coupler 15-1, the phase of the RF transmission signal $RF_T$ mixed in the RF reception signal $RF_{R-1}$ becomes inverted from the phase of the signal $S_5$ input from the attenuator 24-1 to the coupler 15-1.

In the first case, the switch 23 electrically couples the first terminal 23a and the second terminal 23b-1. The switch 23 passes the signal $S_3$ and outputs a signal $S_4$ to the attenuator 24-1.

In the first embodiment, the signal $S_4$ corresponds to an example of a "fifth signal" of the present disclosure.

The attenuator 24-1 outputs the signal $S_5$, which is obtained by attenuating the signal $S_4$ by a predetermined attenuation amount, to the coupler 15-1.

In the first embodiment, the signal $S_5$ corresponds to an example of a "second signal" of the present disclosure.

Note that the predetermined attenuation amount of the attenuator 24-1 is a value obtained by subtracting the sum of the losses of the coupler 10, the delay circuit 21, the phase shifter 22, the switch 23, and the coupler 15-1 from the sum of the losses and gains of the coupler 10, the power amplifier circuit 11, the switch 12, the duplexer 13-1, and the coupler 15-1. Accordingly, in the transmission path of the RF reception signal $RF_{R-1}$ of the coupler 15-1, the power of the RF transmission signal $RF_T$ mixed in the RF reception signal $RF_{R-1}$ becomes substantially the same as the power of the signal $S_5$ input from the attenuator 24-1 to the coupler 15-1. Being "substantially the same" in the present disclosure is defined as that the difference in amplitude between the mixed RF transmission signal $RF_T$ and the signal $S_5$ is less than or equal to 2 dB.

The coupler 15-1 couples (overlaps) the signal $S_5$ to the RF reception signal $RF_{R-1}$. In the transmission path of the RF reception signal $RF_{R-1}$ of the coupler 15-1, the signal $S_5$ and the RF transmission signal $RF_T$ mixed in the RF reception signal $RF_{R-1}$ have the same delay amount, inverted phases, and substantially the same power. Therefore, the mixed RF transmission signal $RF_T$ is suppressed (ideally canceled out) in the RF reception signal $RF_{R-1}$ after passing the coupler 15-1.

Second Case

Referring back to FIG. 2, the coupler 10 divides the RF transmission signal $RF_T$ into two, and outputs one RF transmission signal $RF_T$ to the power amplifier circuit 11 and the other signal $S_1$ to the delay circuit 21. The signal $S_1$ is a signal with the same waveform as the RF transmission signal $RF_T$ but with smaller power.

The delay circuit 21 outputs the signal $S_2$, which is obtained by delaying the signal $S_1$ by a predetermined delay time, to the phase shifter 22.

The phase shifter 22 outputs the signal $S_3$, which is obtained by shifting the phase of the signal $S_2$ by a predetermined phase shift amount, to the first terminal 23a.

In the second case, the switch 23 electrically couples the first terminal 23a and the second terminal 23b-N. The switch 23 passes the signal $S_3$ and outputs the signal $S_4$ to the attenuator 24-N.

The attenuator 24-N outputs a signal $S_6$, which is obtained by attenuating the signal $S_4$ by a predetermined attenuation amount, to the coupler 15-N.

In the first embodiment, the signal $S_6$ corresponds to an example of the "second signal" of the present disclosure.

Note that the predetermined attenuation amount of the attenuator 24-N is a value obtained by subtracting the sum of the losses of the coupler 10, the delay circuit 21, the phase shifter 22, the switch 23, and the coupler 15-N from the sum of the losses and gains of the coupler 10, the power amplifier circuit 11, the switch 12, the duplexer 13-N, and the coupler 15-N. Accordingly, in the transmission path of the RF reception signal $RF_{R-N}$ of the coupler 15-N, the power of the RF transmission signal $RF_T$ mixed in the RF reception signal $RF_{R-N}$ becomes substantially the same as the power of the signal $S_6$ input from the attenuator 24-N to the coupler 15-N.

The coupler 15-N couples (overlaps) the signal $S_6$ to the RF reception signal $RF_{R-N}$. In the transmission path of the RF reception signal $RF_{R-N}$ of the coupler 15-N, the signal $S_6$ and the RF transmission signal $RF_T$ mixed in the RF reception signal $RF_{R-N}$ have substantially the same delay amount, inverted phases, and substantially the same power. Therefore, the mixed RF transmission signal $RF_T$ is suppressed (ideally canceled out) in the RF reception signal $RF_{R-N}$ after passing the coupler 15-N.

SPECIFIC EXAMPLES

Figure 3:
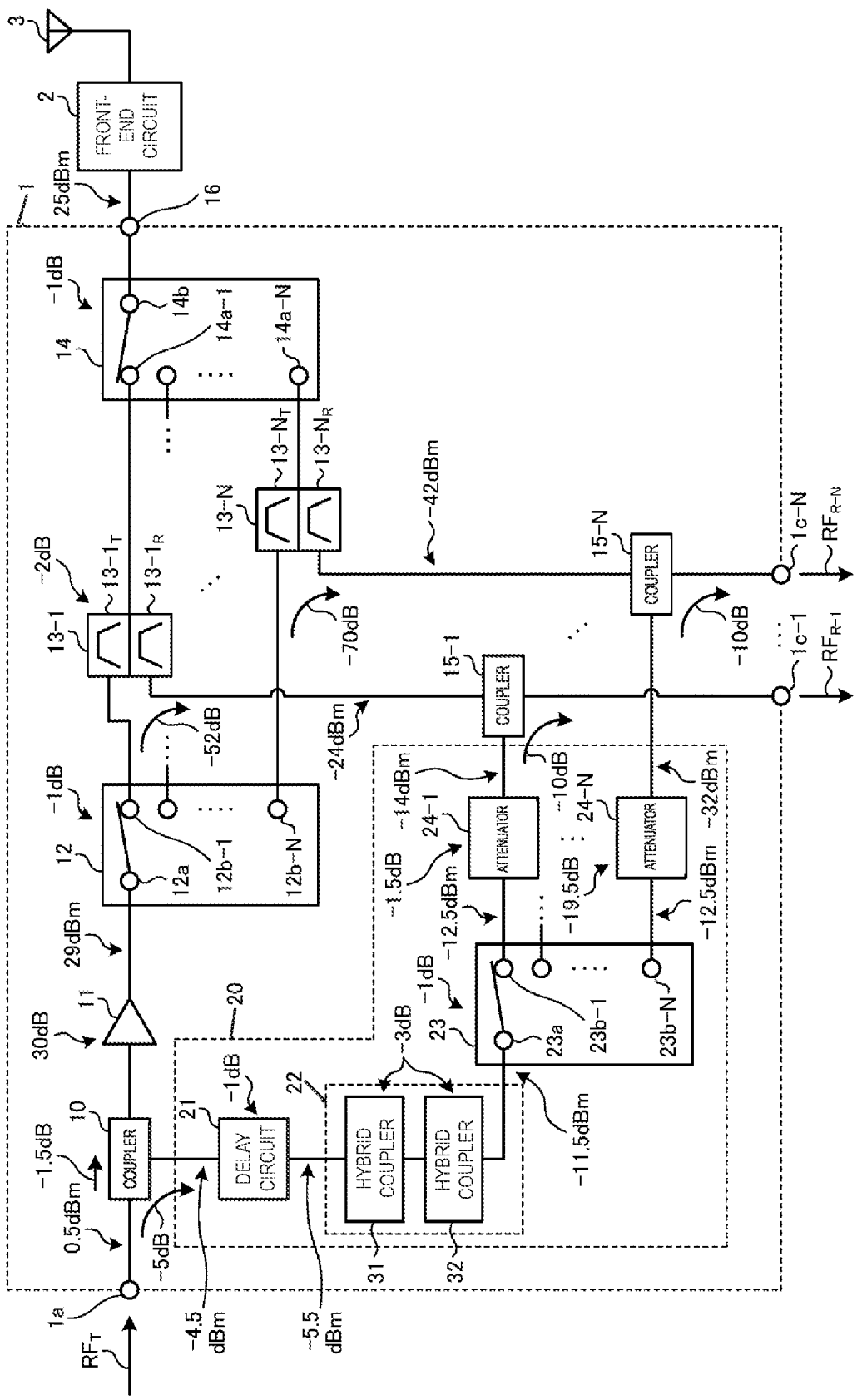
FIG. 3 is a diagram illustrating a specific example of the loss and gain, and signal power of each part of the RF signal transmitting/receiving circuit according to the first embodiment.

FIG. 3 is a diagram illustrating a specific example of the loss and gain, and signal power of each part of the RF signal transmitting/receiving circuit according to the first embodiment.

First Case

The power of the RF transmission signal $RF_T$ input to the coupler 10 is about 0.5 dBm. The loss of the coupler 10 is about −1.5 dB to the power amplifier circuit 11 side and is about −5 dB to the delay circuit 21 side.

The power of the RF transmission signal $RF_T$ input from the coupler 10 to the power amplifier circuit 11 is approximately −1 dBm (=0.5−1.5). The gain of the power amplifier circuit 11 is about 30 dB. The power of the RF transmission signal $RF_T$ output from the power amplifier circuit 11 is approximately 29 dBm (=−1+30).

The loss of the switch 12 is approximately −1 dB. The loss of the transmission filter 13-$1_T$ is approximately −2 dB. The loss of the switch 14 is approximately −1 dB. Therefore, the power of the RF transmission signal $RF_T$ output from the input/output terminal 1b to the front-end circuit 2 is about 25 dBm (=29−1−2−1).

The loss due to isolation between the transmission filter 13-$1_T$ and the reception filter 13-$1_R$ of the duplexer 13-1 is approximately −52 dB. Therefore, the power of the RF transmission signal $RF_T$ mixed in the RF reception signal $RF_{R-1}$ output from the reception filter 13-$1_R$ to the coupler 15-1 is about −24 dBm (=29−1−52).

In contrast, the power of a signal input from the coupler 10 to the delay circuit 21 is approximately −4.5 dBm (=0.5−5).

The loss of the delay circuit 21 is approximately −1 dB. Therefore, the power of a signal output from the delay circuit 21 to the phase shifter 22 is approximately −5.5 dBm (=−4.5−1).

The phase shifter 22 includes hybrid couplers 31 and 32. The loss of each of the hybrid couplers 31 and 32 is approximately −3 dB. Therefore, the power of a signal output from the phase shifter 22 to the switch 23 is approximately −11.5 dBm (=−5.5−3−3).

The loss of the switch 23 is approximately −1 dB. Therefore, the power of a signal output from the switch 23 to the attenuator 24-1 is approximately −12.5 dBm (=−11.5−1).

The attenuation amount of the attenuator 24-1 is approximately −1.5 dB. Therefore, the power of a signal output from the attenuator 24-1 to the coupler 15-1 is approximately −14 dBm (=−12.5−1.5).

The loss of a coupling path from the attenuator 24-1 to the coupler 15-1 is approximately −10 dB. Therefore, in the coupler 15-1, the power, which is about −24 dBm, of the RF transmission signal $RF_T$ mixed in the RF reception signal $RF_{R-1}$ becomes the same as the power, which is approximately −24 dBm (=−14−10), of a signal input from the attenuator 24-1 to the coupler 15-1.

The signal input from the attenuator 24-1 to the coupler 15-1 and the RF transmission signal $RF_T$ mixed in the RF reception signal $RF_{R-1}$ have substantially the same power. Therefore, the mixed RF transmission signal $RF_T$ is suppressed in the RF reception signal $RF_{R-1}$ after passing the coupler 15-1.

Figure 4:
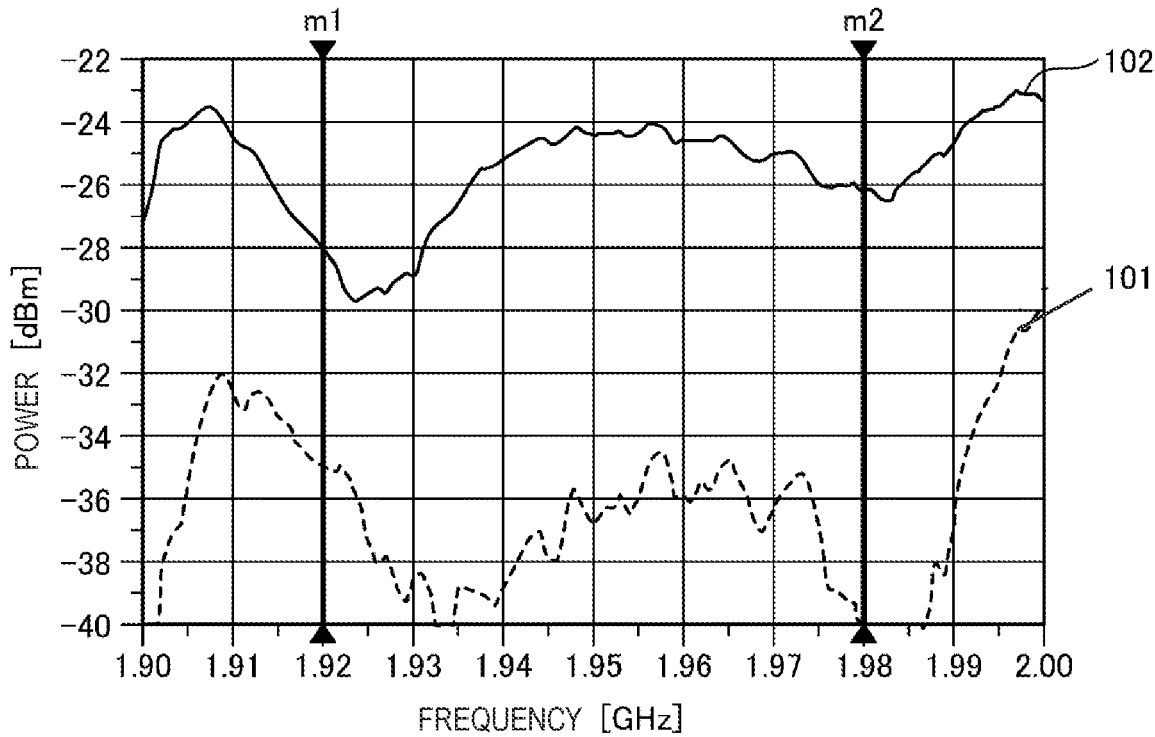
FIG. 4 is a diagram illustrating the result of a circuit simulation of the RF signal transmitting/receiving circuit according to the first embodiment.

FIG. 4 is a diagram illustrating the result of a circuit simulation of the RF signal transmitting/receiving circuit according to the first embodiment. A waveform 101 is a waveform indicating the power of the RF transmission signal $RF_T$ mixed in the RF reception signal $RF_{R-1}$ of the RF signal transmitting/receiving circuit 1 in the first embodiment. A waveform 102 is a waveform indicating the power of the RF transmission signal $RF_T$ mixed in the RF reception signal $RF_{R-1}$ of an RF signal transmitting/receiving circuit including no signal output circuit 20.

A frequency m1 is the lower limit frequency, which is about 1.92 GHz, of RF transmission signals in band 1 of LTE. A frequency m2 is the upper limit frequency, which is about 1.98 GHz, of RF transmission signals in band 1 of LTE.

From comparison of the waveform 101 and the waveform 102, the RF signal transmitting/receiving circuit 1 may suppress the power of the RF transmission signal $RF_T$ mixed in the RF reception signal $RF_{R-1}$ over the entire frequency band (from frequencies m1 to m2) of RF transmission signals in band 1 of LTE.

Second Case

Referring back to FIG. 3, the power of a signal input to the coupler 10 is about 0.5 dBm. The loss of the coupler 10 is approximately −1.5 dB to the power amplifier circuit 11 side and is approximately −5 dB to the delay circuit 21 side.

The power of the RF transmission signal $RF_T$ input from the coupler 10 to the power amplifier circuit 11 is approximately −1 dBm (=0.5−1.5). The gain of the power amplifier circuit 11 is approximately 30 dB. The power of the RF transmission signal $RF_T$ output from the power amplifier circuit 11 is approximately 29 dBm (=−1+30).

The loss of the switch 12 is approximately −1 dB. The loss due to isolation between the transmission filter 13-$N_T$ and the reception filter 13-$N_R$ of the duplexer 13-N is approximately −70 dB. Therefore, the power of the mixed RF transmission signal $RF_T$, which is output from the reception filter 13-$N_R$ to the coupler 15-N, is approximately −42 dBm (=29−1−70).

In contrast, the power of the RF transmission signal $RF_T$ input from the coupler 10 to the delay circuit 21 is approximately −4.5 dBm (=0.5−5)

The loss of the delay circuit 21 is approximately −1 dB. Therefore, the power of a signal output from the delay circuit 21 to the phase shifter 22 is approximately −5.5 dBm (=−4.5−1).

The loss of each of the hybrid couplers 31 and 32 is approximately −3 dB. Therefore, the power of a signal output from the phase shifter 22 to the switch 23 is approximately −11.5 dBm (=−5.5−3−3).

The loss of the switch 23 is approximately −1 dB. Therefore, the power of a signal output from the switch 23 to the attenuator 24-N is approximately −12.5 dBm (=−11.5−1).

The attenuation amount of the attenuator 24-N is approximately −19.5 dB. Therefore, the power of a signal output from the attenuator 24-N to the coupler 15-N is approximately −32 dBm (=−12.5−19.5).

The loss of a coupling path from the attenuator 24-N to the coupler 15-N is approximately −10 dB. Therefore, in the coupler 15-N, the power, which is approximately −42 dBm, of the RF transmission signal $RF_T$ mixed in the RF reception signal $RF_{R-N}$ becomes the same as the power, which is approximately −42 dBm (=−32−10), of a signal input from the attenuator 24-N to the coupler 15-N.

The signal input from the attenuator 24-N to the coupler 15-N and the RF transmission signal $RF_T$ mixed in the RF reception signal $RF_{R-N}$ have the same power. Therefore, the mixed RF transmission signal $RF_T$ is suppressed in the RF reception signal $RF_{R-N}$ after passing the coupler 15-N.

Figure 5:
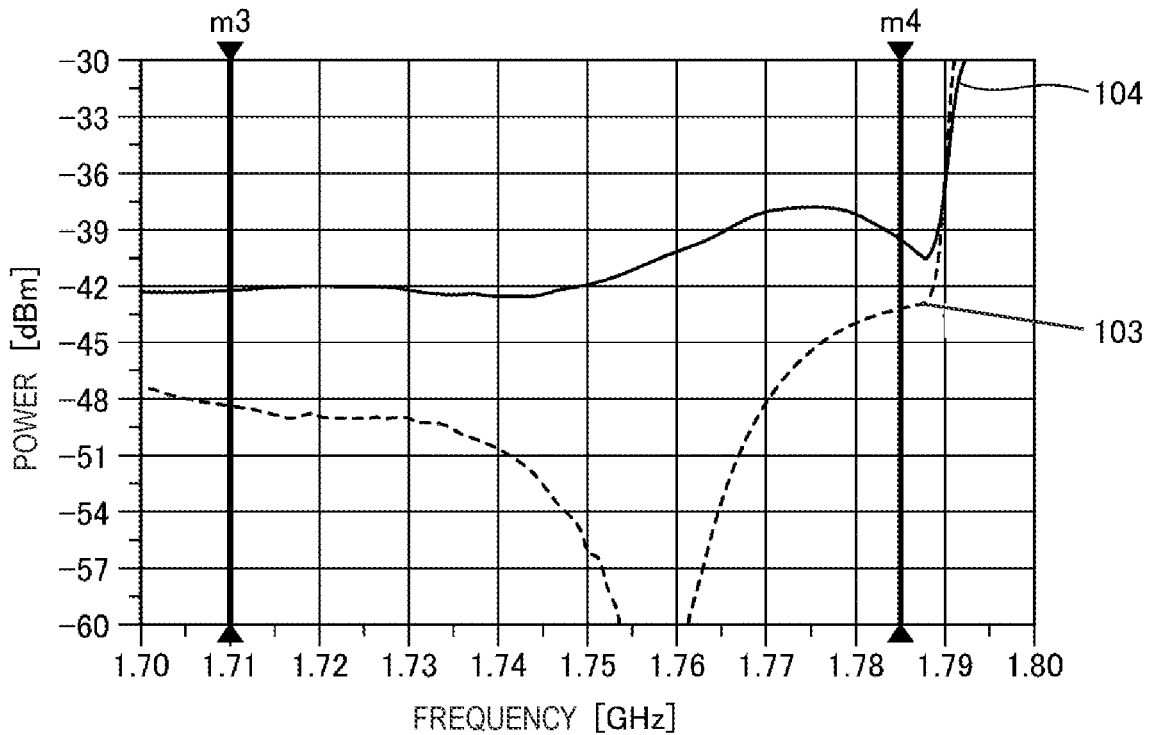
FIG. 5 is a diagram illustrating the result of a circuit simulation of the RF signal transmitting/receiving circuit according to the first embodiment.

FIG. 5 is a diagram illustrating the result of a circuit simulation of the RF signal transmitting/receiving circuit according to the first embodiment. A waveform 103 is a waveform indicating the power of the RF transmission signal $RF_T$ mixed in the RF reception signal $RF_{R-N}$ of the RF signal transmitting/receiving circuit 1 in the first embodiment. A waveform 104 is a waveform indicating the power of the RF transmission signal $RF_T$ mixed in the RF reception signal $RF_{R-N}$ of an RF signal transmitting/receiving circuit including no signal output circuit 20.

A frequency m3 is the lower limit frequency, which is about 1.71 GHz, of RF transmission signals in band 3 of LTE. A frequency m4 is the upper limit frequency, which is about 1.785 GHz, of RF transmission signals in band 3 of LTE.

From comparison of the waveform 103 and the waveform 104, the RF signal transmitting/receiving circuit 1 may suppress the power of the RF transmission signal $RF_T$ mixed in the RF reception signal $RF_{R-N}$ over the entire frequency band (from frequencies m3 to m4) of RF transmission signals in band 3 of LTE.

SUMMARY

As has been described above, the signal output circuit 20 outputs the signal $S_5$, which has substantially the same delay amount, an inverted phase, and substantially the same power as the RF transmission signal $RF_T$ mixed in the RF reception signal $RF_{R-1}$, to the coupler 15-1. The coupler 15-1 couples the signal $S_5$ to the RF reception signal $RF_{R-1}$. Accordingly, the RF signal transmitting/receiving circuit 1 may suppress the RF transmission signal $RF_T$ mixed in the RF reception signal $RF_{R-1}$.

In addition, the signal output circuit 20 outputs the signal $S_6$, which has substantially the same delay amount, an inverted phase, and substantially the same power as the RF transmission signal $RF_T$ mixed in the RF reception signal $RF_{R-N}$, to the coupler 15-N. The coupler 15-N couples the signal $S_6$ to the RF reception signal $RF_{R-N}$. Accordingly, the RF signal transmitting/receiving circuit 1 may suppress the RF transmission signal $RF_T$ mixed in the RF reception signal $RF_{R-1}$.

As described above, the RF signal transmitting/receiving circuit 1 may suppress the RF transmission signal $RF_T$ mixed in the multiple RF reception signals $RF_{R-1}$ to $RF_{R-N}$. Accordingly, the RF signal transmitting/receiving circuit 1 may improve the reception sensitivity of the multiple RF reception signals $RF_{R-1}$ to $RF_{R-N}$.

Second Embodiment

Figure 6:
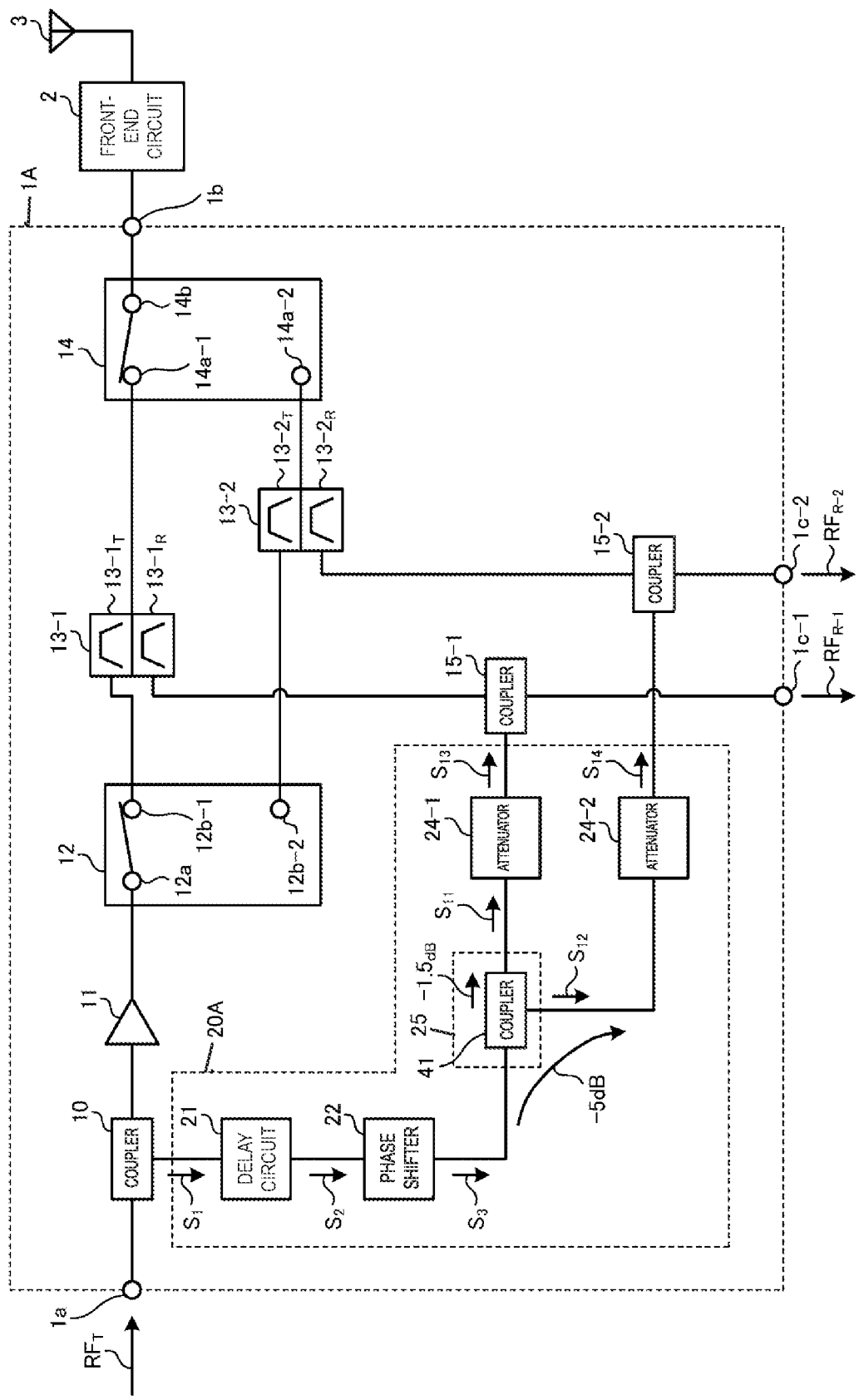
FIG. 6 is a diagram illustrating the configuration of an RF signal transmitting/receiving circuit according to a second embodiment.

FIG. 6 is a diagram illustrating the configuration of an RF signal transmitting/receiving circuit according to the second embodiment. Among the elements of an RF signal transmitting/receiving circuit 1A, the same elements as the RF signal transmitting/receiving circuit 1 of the first embodiment are given the same reference numerals, and descriptions thereof are omitted.

The RF signal transmitting/receiving circuit 1A of the second embodiment indicates the case where N=2.

Compared to the RF signal transmitting/receiving circuit 1 (see FIGS. 1 and 2), the RF signal transmitting/receiving circuit 1A includes a signal output circuit 20A instead of the signal output circuit 20.

Compared to the signal output circuit 20, the signal output circuit 20A includes a distribution circuit 25 instead of the switch 23.

In the second embodiment, the distribution circuit 25 corresponds to an example of a "second distribution circuit" of the present disclosure.

The distribution circuit 25 divides the signal $S_3$, input from the phase shifter 22, into two, and outputs the two signals.

The distribution circuit 25 includes a coupler 41. The coupler 41 divides the signal $S_3$, input from the phase shifter 22, into two, and outputs one signal $S_{11}$ to the attenuator 24-1 and the other signal $S_{12}$ to the attenuator 24-2.

In the second embodiment, the signals $S_{11}$ and $S_{12}$ correspond to an example of the "fifth signal" of the present disclosure.

The loss of the coupler 41 is approximately −1.5 dB to the attenuator 24-1 side (signal $S_{11}$ side) and is approximately −5 dB to the attenuator 24-2 side (signal $S_{12}$ side).

The attenuator 24-1 outputs a signal $S_{13}$, which is obtained by attenuating the signal $S_{11}$ by a predetermined attenuation amount, to the coupler 15-1.

In the second embodiment, the signal $S_{13}$ corresponds to an example of the "second signal" of the present disclosure.

Note that the predetermined attenuation amount of the attenuator 24-1 is a value obtained by subtracting the sum of the losses of the coupler 10, the delay circuit 21, the phase shifter 22, the coupler 41 (a loss of about −1.5 dB), and the coupler 15-1 from the sum of the losses and gains of the coupler 10, the power amplifier circuit 11, the switch 12, the duplexer 13-1, and the coupler 15-1. Accordingly, in the transmission path of the RF reception signal $RF_{R-1}$ of the coupler 15-1, the power of the RF transmission signal $RF_T$ mixed in the RF reception signal $RF_{R-1}$ becomes the same as the power of the signal $S_{13}$ input from the attenuator 24-1 to the coupler 15-1.

The attenuator 24-2 outputs a signal $S_{14}$, which is obtained by attenuating the signal $S_{12}$ by a predetermined attenuation amount, to the coupler 15-2.

In the second embodiment, the signal $S_{14}$ corresponds to an example of the "second signal" of the present disclosure.

Unlike FIG. 6, the case where the switch 12 electrically couples the first terminal 12a and the second terminal 12b-2 will be considered. The predetermined attenuation amount of the attenuator 24-2 is a value obtained by subtracting the sum of the losses of the coupler 10, the delay circuit 21, the phase shifter 22, the coupler (a loss of about −5 dB), and the coupler 15-2 from the sum of the losses and gains of the coupler 10, the power amplifier circuit 11, the switch 12, the duplexer 13-2, and the coupler 15-2. Accordingly, in the transmission path of the RF reception signal $RF_{R-2}$ of the coupler 15-2, the power of the RF transmission signal $RF_T$ mixed in the RF reception signal $RF_{R-2}$ becomes the same as the power of the signal $S_{14}$ input from the attenuator 24-2 to the coupler 15-2.

Like the RF signal transmitting/receiving circuit 1, the RF signal transmitting/receiving circuit 1A may suppress the RF transmission signal $RF_T$ mixed in the multiple RF reception signals $RF_{R-1}$ and $RF_{R-2}$. Accordingly, the RF signal transmitting/receiving circuit 1A may improve the reception sensitivity of the multiple RF reception signals $RF_{R-1}$ and $RF_{R-2}$.

Furthermore, compared to the RF signal transmitting/receiving circuit 1, the RF signal transmitting/receiving circuit 1A includes no switch 23. Therefore, the cost for the switch 23 may be reduced in the RF signal transmitting/receiving circuit 1A. In addition, because the control wiring of the switch 23 is optional in the RF signal transmitting/receiving circuit 1A, the size of the RF signal transmitting/receiving circuit 1A may be reduced.

Also, the RF signal transmitting/receiving circuit 1A uses no active component. Therefore, the RF signal transmitting/receiving circuit 1A may reduce the power consumption, and the clock noise of a control signal will not be mixed in an RF reception signal.

Third Embodiment

Circuit Configuration

Figure 7:
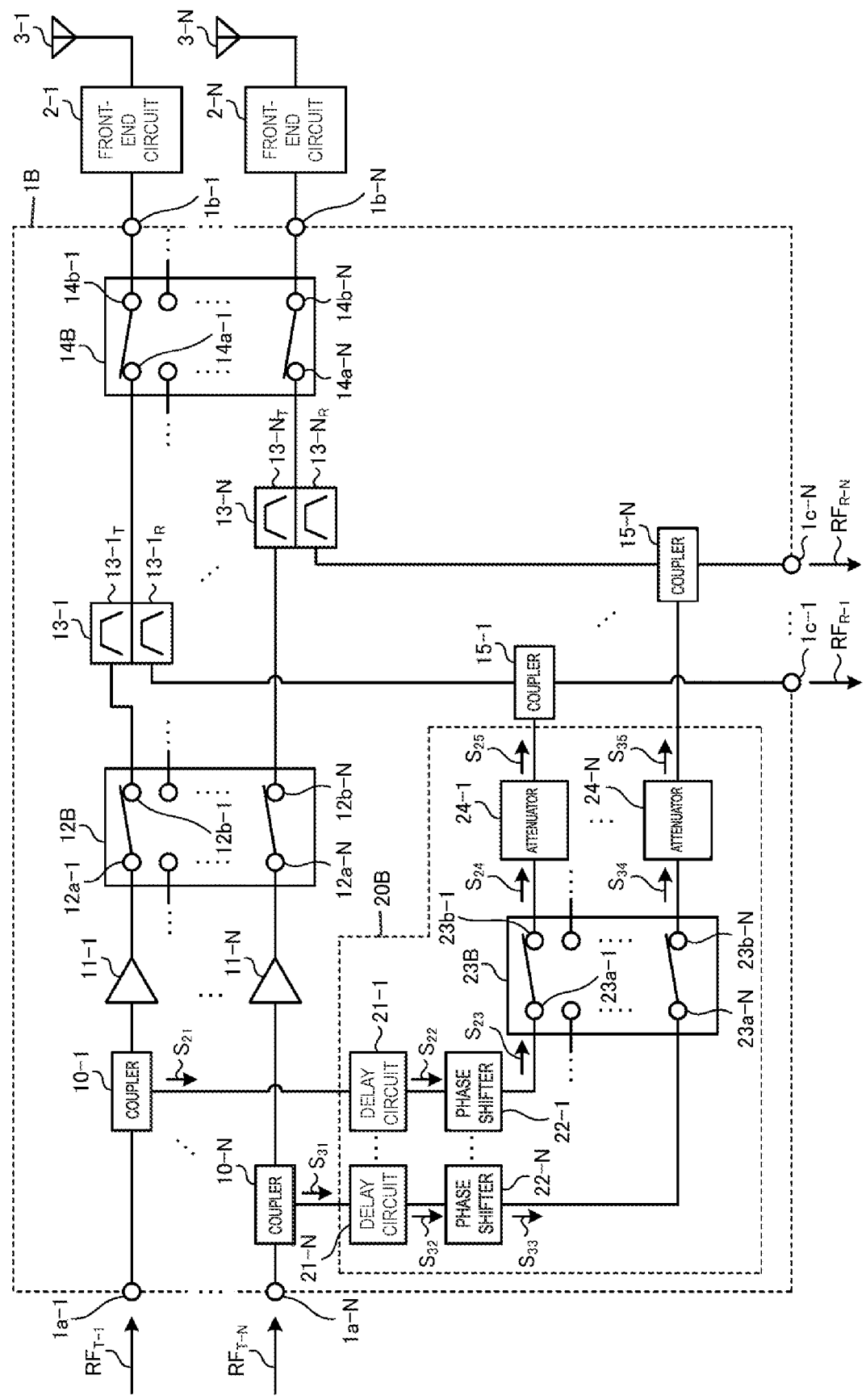
FIG. 7 is a diagram illustrating the configuration of an RF signal transmitting/receiving circuit according to a third embodiment.

FIG. 7 is a diagram illustrating the configuration of an RF signal transmitting/receiving circuit according to a third embodiment. Among the elements of an RF signal transmitting/receiving circuit 1B, the same elements as the RF signal transmitting/receiving circuit 1 of the first embodiment or the RF signal transmitting/receiving circuit 1A of the second embodiment are given the same reference numerals, and descriptions thereof are omitted.

The RF signal transmitting/receiving circuit 1B is an RF signal transmitting/receiving module capable of outputting RF transmission signals $RF_{T-1}$ to $RF_{T-N}$ via front-end circuits 2-1 to 2-N to antennas 3-1 to 3-N and receiving RF reception signals $RF_{R-1}$ to $RF_{R-N}$ via the front-end circuits 2-1 to 2-N from the antennas 3-1 to 3-N.

Compared to the RF signal transmitting/receiving circuit 1 (see FIGS. 1 and 2), the RF signal transmitting/receiving circuit 1B includes couplers 10-1 to 10-N instead of the coupler 10. Compared to the RF signal transmitting/receiving circuit 1, the RF signal transmitting/receiving circuit 1B includes power amplifier circuits 11-1 to 11-N instead of the power amplifier circuit 11. Compared to the RF signal transmitting/receiving circuit 1, the RF signal transmitting/receiving circuit 1B includes a switch 12B instead of the switch 12. Compared to the RF signal transmitting/receiving circuit 1, the RF signal transmitting/receiving circuit 1B includes a switch 14B instead of the switch 14. Compared to the RF signal transmitting/receiving circuit 1, the RF signal transmitting/receiving circuit 1B includes a signal output circuit 20B instead of the signal output circuit 20.

Each of the couplers 10-1 to 10-N corresponds to an example of the "distribution circuit" of the present disclosure.

The switch 12B includes first terminals 12a-1 to 12a-N and second terminals 12b-1 to 12b-N.

The first terminals 12a-1 to 12a-N of the switch 12B are electrically coupled to output terminals of the power amplifier circuits 11-1 to 11-N, respectively.

The switch 14B includes first terminals 14a-1 to 14a-N and second terminals 14b-1 to 14b-N.

The second terminals 14b-1 to 14b-N of the switch 14B are electrically coupled to the front-end circuits 2-1 to 2-N, respectively, with input/output terminals 1b-1 to 1b-N interposed therebetween.

RF Signal Transmitting/Receiving Operation

The RF transmission signal $RF_{T-1}$ is input to the power amplifier circuit 11-1 via an input terminal 1a-1 and the coupler 10-1. Although the RF transmission signal $RF_{T-1}$ is exemplified by an RF transmission signal in band 1 of LTE, the present disclosure is not limited to signal. The power amplifier circuit 11-1 amplifies the RF transmission signal $RF_{T-1}$ and outputs the amplified signal to the first terminal 12a-1 of the switch 12B.

The RF transmission signal $RF_{T-N}$ is input to the power amplifier circuit 11-N via an input terminal 1a-N and the coupler 10-N. Although the RF transmission signal $RF_{T-N}$ is exemplified by an RF transmission signal in band 3 of LTE, the present disclosure is not limited to this signal. The power amplifier circuit 11-N amplifies the RF transmission signal $RF_{T-N}$ and outputs the amplified signal to the first terminal 12a-N of the switch 12B.

The switch 12B electrically couples the first terminal 12a-1 and any of the second terminals 12b-1 to 12b-N. The switch 12B also electrically couples the first terminal 12a-N and any of the second terminals 12b-1 to 12b-N.

In the case illustrated in FIG. 7, the RF transmission signal $RF_{T-1}$ is an RF transmission signal in band 1 of LTE, and the state where the switch 12B electrically couples the first terminal 12a-1 and the second terminal 12b-1 is illustrated. In addition, the RF transmission signal $RF_{T-N}$ is an RF transmission signal in band 3 of LTE, and the state where the switch 12B electrically couples the first terminal 12a-N and the second terminal 12b-N is illustrated.

The switch 14B electrically couples any of the first terminals 14a-1 to 14a-N and the second terminal 14b-1. The switch 14B also electrically couples any of the first terminals 14a-1 to 14a-N and the second terminal 14b-N.

In the case illustrated in FIG. 7, the RF transmission signal $RF_{T-1}$ is an RF transmission signal in band 1 of LTE, the RF reception signal $RF_{R-1}$ is an RF reception signal in band 1 of LTE, and the state where the switch 14B electrically couples the first terminal 14a-1 and the second terminal 14b-1 is illustrated. In addition, the RF transmission signal $RF_{T-N}$ is an RF transmission signal in band 3 of LTE, the RF reception signal $RF_{R-N}$ is an RF reception signal in band 3 of LTE, and the state where the switch 14B electrically couples the first terminal 14a-N and the second terminal 14b-N is illustrated.

In the case illustrated in FIG. 7, the RF transmission signal $RF_{T-1}$ is amplified by the power amplifier circuit 11-1, is band-passed by the transmission filter 13-1$_T$ via the first terminal 12a-1 and the second terminal 12b-1, and is transmitted to the antenna 3-1 via the first terminal 14a-1, the second terminal 14b-1, and the front-end circuit 2-1.

Also, in the case illustrated in FIG. 7, the RF reception signal $RF_{R-1}$ input from the front-end circuit 2-1 is band-passed by the reception filter 13-1$_R$ via the second terminal 14b-1 and the first terminal 14a-1, and is output from the output terminal 1c-1.

In the case illustrated in FIG. 7, the RF transmission signal $RF_{T-N}$ is amplified by the power amplifier circuit 11-N, is band-passed by the transmission filter 13-N$_T$ via the first terminal 12a-N and the second terminal 12b-N, and is transmitted to the antenna 3-N via the first terminal 14a-N, the second terminal 14b-N, and the front-end circuit 2-N.

Also, in the case illustrated in FIG. 7, the RF reception signal $RF_{R-N}$ input from the front-end circuit 2-N is band-passed by the reception filter 13-N$_R$ via the second terminal 14b-N and the first terminal 14a-N, and is output from the output terminal 1c-N.

The RF signal transmitting/receiving circuit 1B is capable of simultaneously transmitting the multiple RF transmission signals $RF_{T\text{-}1}$ to $RF_{T\text{-}N}$. The RF signal transmitting/receiving circuit 1B is also capable of simultaneously receiving the multiple RF reception signals $RF_{R\text{-}1}$ to $RF_{R\text{-}N}$.

Operation of Signal Output Circuit

Compared to the signal output circuit 20, the signal output circuit 20B includes delay circuits 21-1 to 21-N instead of the delay circuit 21. Compared to the signal output circuit 20, the signal output circuit 20B includes phase shifters 22-1 to 22-N instead of the phase shifter 22. Compared to the signal output circuit 20, the signal output circuit 20B includes a switch 23B instead of the switch 23.

The switch 23B includes first terminals 23a-1 to 23a-N and second terminals 23b-1 to 23b-N. The first terminals 23a-1 to 23a-N of the switch 23B are electrically coupled to the phase shifters 22-1 to 22-N, respectively. The second terminals 23b-1 to 23b-N of the switch 23B are electrically coupled to the attenuators 24-1 to 24-N, respectively.

The switch 23B electrically couples the first terminal 23a-1 and any of the second terminals 23b-1 to 23b-N. The switch 23B also electrically couples the first terminal 23a-N and any of the second terminals 23b-1 to 23b-N.

In the case illustrated in FIG. 7, the state where the switch 23B electrically couples the first terminal 23a-1 and the second terminal 23b-1 is illustrated. In addition, the state where the switch 23B electrically couples the first terminal 23a-N and the second terminal 23b-N is illustrated.

The coupler 10-1 divides the RF transmission signal $RF_{T\text{-}1}$ into two, and outputs one RF transmission signal $RF_{T\text{-}1}$ to the power amplifier circuit 11-1 and the other signal $S_{21}$ to the delay circuit 21-1. The signal $S_{21}$ is a signal with the same waveform as the RF transmission signal $RF_{T\text{-}1}$ but with smaller power.

In the third embodiment, the signal $S_{21}$ corresponds to an example of the "first signal" of the present disclosure.

The delay circuit 21-1 outputs a signal $S_{22}$, which is obtained by delaying the signal $S_{21}$ by a predetermined delay time, to the phase shifter 22-1.

In the third embodiment, the signal $S_{22}$ corresponds to an example of the "third signal" of the present disclosure.

Note that the predetermined delay time of the delay circuit 21-1 is a value obtained by subtracting the sum of the delay times of the coupler 10-1, the phase shifter 22-1, the switch 23B, the attenuator 24-1, and the coupler 15-1 from the sum of the delay times of the coupler 10-1, the power amplifier circuit 11-1, the switch 12B, the duplexer 13-1, and the coupler 15-1. Accordingly, in the transmission path of the RF reception signal $RF_{R\text{-}1}$ of the coupler 15-1, the delay of the RF transmission signal $RF_{T\text{-}1}$ mixed in the RF reception signal $RF_{R\text{-}1}$ becomes the same as the delay of a signal $S_{25}$ input from the attenuator 24-1 to the coupler 15-1.

The phase shifter 22-1 outputs a signal $S_{23}$, which is obtained by shifting the phase of the signal $S_{22}$ by a predetermined phase shift amount, to the first terminal 23a-1 of the switch 23B.

In the third embodiment, the signal $S_{23}$ corresponds to an example of the "fourth signal" of the present disclosure.

Note that the predetermined phase shift amount of the phase shifter 22-1 is a value obtained by subtracting the sum of the phase shift amounts of the coupler 10-1, the delay circuit 21-1, the switch 23B, the attenuator 24-1, and the coupler 15-1 from a value obtained by adding 180° to the sum of the phase shift amounts of the coupler 10-1, the power amplifier circuit 11-1, the switch 12B, the duplexer 13-1, and the coupler 15-1. Accordingly, in the transmission path of the RF reception signal $RF_{R\text{-}1}$ of the coupler 15-1, the phase of the RF transmission signal $RF_{T\text{-}1}$ mixed in the RF reception signal $RF_{R\text{-}1}$ becomes inverted from the phase of the signal $S_{25}$ input from the attenuator 24-1 to the coupler 15-1.

In the case illustrated in FIG. 7, the switch 23B electrically couples the first terminal 23a-1 and the second terminal 23b-1. The switch 23B outputs a signal $S_{24}$, which is obtained by passing the signal $S_{23}$, to the attenuator 24-1.

In the third embodiment, the signal $S_{24}$ corresponds to an example of the "fifth signal" of the present disclosure.

The attenuator 24-1 outputs the signal $S_{25}$, which is obtained by attenuating the signal $S_{24}$ by a predetermined attenuation amount, to the coupler 15-1.

In the third embodiment, the signal $S_{23}$ corresponds to an example of the "second signal" of the present disclosure.

Note that the predetermined attenuation amount of the attenuator 24-1 is a value obtained by subtracting the sum of the losses of the coupler 10-1, the delay circuit 21-1, the phase shifter 22-1, the switch 23B, and the coupler 15-1 from the sum of the losses and gains of the coupler 10-1, the power amplifier circuit 11-1, the switch 12B, the duplexer 13-1, and the coupler 15-1. Accordingly, in the transmission path of the RF reception signal $RF_{R\text{-}1}$ of the coupler 15-1, the power of the RF transmission signal $RF_{T\text{-}1}$ mixed in the RF reception signal $RF_{R\text{-}1}$ becomes the same as the power of the signal $S_{25}$ input from the attenuator 24-1 to the coupler 15-1.

The coupler 15-1 couples the signal $S_{25}$ to the RF reception signal $RF_{R\text{-}1}$. In the transmission path of the RF reception signal $RF_{R\text{-}1}$ of the coupler 15-1, the signal $S_{25}$ and the RF transmission signal $RF_{T\text{-}1}$ mixed in the RF reception signal $RF_{R\text{-}1}$ have the same delay amount, inverted phases, and the same power. Therefore, the mixed RF transmission signal $RF_{T\text{-}1}$ is suppressed in the RF reception signal $RF_{R\text{-}1}$ after passing the coupler 15-1.

The coupler 10-N divides the RF transmission signal $RF_{T\text{-}N}$ into two, and outputs one RF transmission signal $RF_{T\text{-}N}$ to the power amplifier circuit 11 and the other signal $S_{31}$ to the delay circuit 21-N. The signal $S_{31}$ is a signal with the same waveform as the RF transmission signal $RF_{T\text{-}N}$ but with smaller power.

In the third embodiment, the signal $S_{31}$ corresponds to an example of the "first signal" of the present disclosure.

The delay circuit 21-N outputs a signal $S_{32}$, which is obtained by delaying the signal $S_{31}$ by a predetermined delay time, to the phase shifter 22-N.

In the third embodiment, the signal $S_{32}$ corresponds to an example of the "third signal" of the present disclosure.

Note that the predetermined delay time of the delay circuit 21-N is a value obtained by subtracting the sum of the delay times of the coupler 10-N, the phase shifter 22-N, the switch 23B, the attenuator 24-N, and the coupler 15-N from the sum of the delay times of the coupler 10-N, the power amplifier circuit 11-N, the switch 12B, the duplexer 13-N, and the coupler 15-N. Accordingly, in the transmission path of the RF reception signal $RF_{R\text{-}N}$ of the coupler 15-N, the power of the RF transmission signal $RF_{T\text{-}N}$ mixed in the RF reception signal $RF_{R\text{-}N}$ becomes the same as the power of a signal $S_{35}$ input from the attenuator 24-N to the coupler 15-N.

The phase shifter 22-N outputs a signal $S_{33}$, which is obtained by shifting the phase of the signal $S_{32}$ by a predetermined phase shift amount, to the first terminal 23a-N of the switch 23B.

In the third embodiment, the signal $S_{33}$ corresponds to an example of the "fourth signal" of the present disclosure.

Note that the predetermined phase shift amount of the phase shifter 22-N is a value obtained by subtracting the sum of the phase shift amounts of the coupler 10-N, the delay circuit 21-N, the switch 23B, the attenuator 24-N, and the coupler 15-N from a value obtained by adding 180° to the sum of the phase shift amounts of the coupler 10-N, the power amplifier circuit 11-N, the switch 12B, the duplexer 13-N, and the coupler 15-N. Accordingly, in the transmission path of the RF reception signal $RF_{R-N}$ of the coupler 15-N, the phase of the RF transmission signal $RF_{T-N}$ mixed in the RF reception signal $RF_{R-N}$ becomes inverted from the phase of the signal $S_{35}$ input from the attenuator 24-N to the coupler 15-N.

In the case illustrated in FIG. 7, the switch 23B electrically couples the first terminal 23a-N and the second terminal 23b-N. The switch 23B outputs a signal $S_{34}$, which is obtained by passing the signal $S_{33}$, to the attenuator 24-N.

In the third embodiment, the signal $S_{34}$ corresponds to an example of the "fifth signal" of the present disclosure.

The attenuator 24-N outputs the signal $S_{35}$, which is obtained by attenuating the signal $S_{34}$ by a predetermined attenuation amount, to the coupler 15-N.

In the third embodiment, the signal $S_{35}$ corresponds to an example of the "second signal" of the present disclosure.

Note that the predetermined attenuation amount of the attenuator 24-N is a value obtained by subtracting the sum of the losses of the coupler 10-N, the delay circuit 21-N, the phase shifter 22-N, the switch 23B, and the coupler 15-N from the sum of the losses and gains of the coupler 10-N, the power amplifier circuit 11-N, the switch 12B, the duplexer 13-N, and the coupler 15-N. Accordingly, in the transmission path of the RF reception signal $RF_{R-N}$ of the coupler 15-N, the power of the RF transmission signal $RF_{T-N}$ mixed in the RF reception signal $RF_{R-N}$ becomes the same as the power of the signal $S_{35}$ input from the attenuator 24-N to the coupler 15-N.

The coupler 15-N couples the signal $S_{35}$ to the RF reception signal $RF_{R-N}$. In the transmission path of the RF reception signal $RF_{R-N}$ of the coupler 15-N, the signal $S_{33}$ and the RF transmission signal $RF_{T-N}$ mixed in the RF reception signal $RF_{R-N}$ have the same delay amount, inverted phases, and the same power. Therefore, the mixed RF transmission signal $RF_{T-N}$ is suppressed in the RF reception signal $RF_{R-N}$ after passing the coupler 15-N.

SUMMARY

Even in the case of simultaneous transmission/reception of RF signals in multiple bands, the RF signal transmitting/receiving circuit 1B may suppress the RF transmission signals $RF_{T-1}$ to $RF_{T-N}$ respectively mixed in the multiple RF reception signals $RF_{R-1}$ to $RF_{R-N}$. Accordingly, the RF signal transmitting/receiving circuit 1B may improve the reception sensitivity of the multiple RF reception signals $RF_{R-1}$ to $RF_{R-N}$.

Fourth Embodiment

Figure 8:
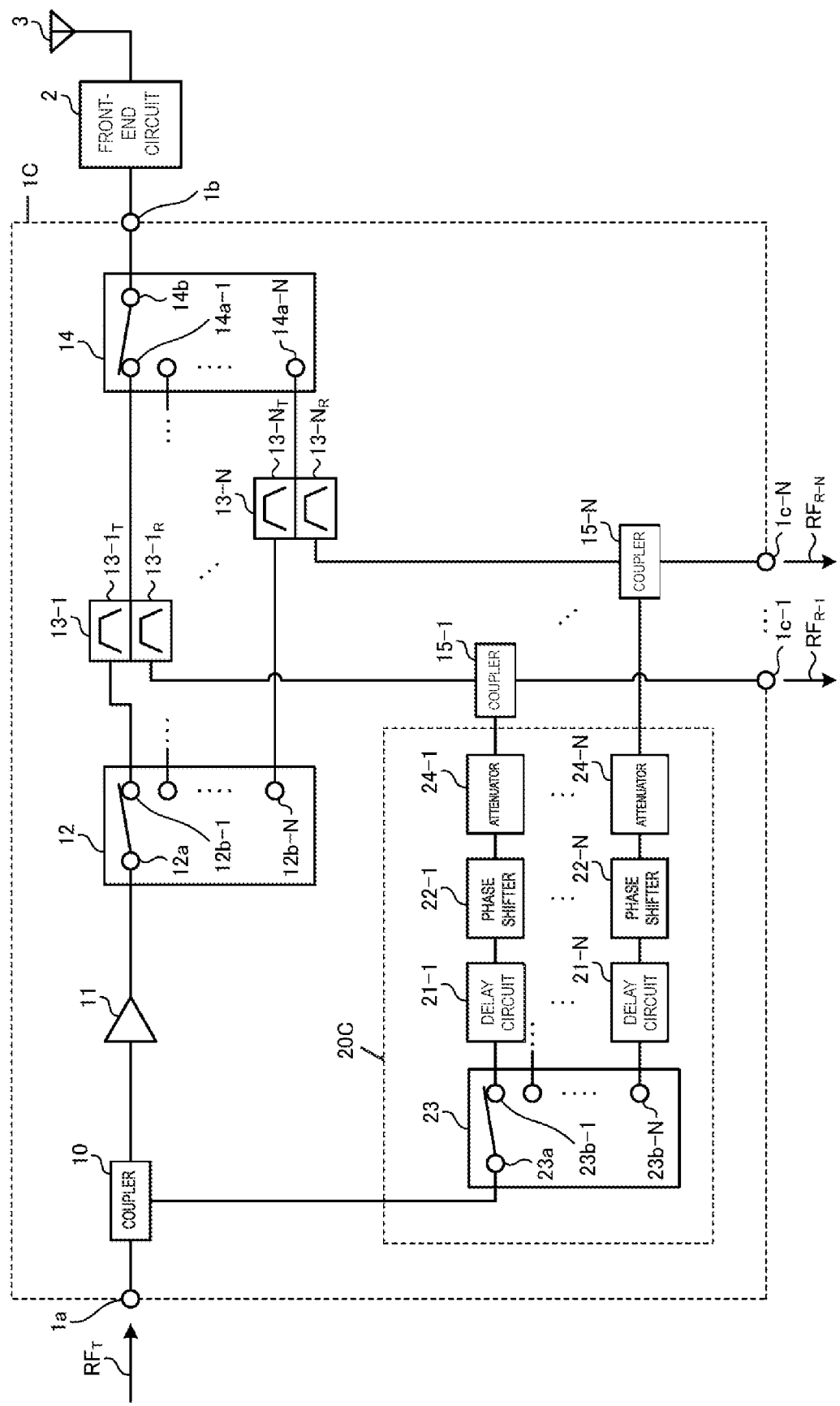
FIG. 8 is a diagram illustrating the configuration of an RF signal transmitting/receiving circuit according to a fourth embodiment.

FIG. 8 is a diagram illustrating the configuration of an RF signal transmitting/receiving circuit according to a fourth embodiment. Among the elements of an RF signal transmitting/receiving circuit 1C, the same elements as the RF signal transmitting/receiving circuits 1 to 1B of the first to third embodiments are given the same reference numerals, and descriptions thereof are omitted.

Compared to the RF signal transmitting/receiving circuit 1 (see FIGS. 1 and 2), the RF signal transmitting/receiving circuit 1C includes a signal output circuit 20C instead of the signal output circuit 20.

Compared to the signal output circuit 20, the signal output circuit 20C includes delay circuits 21-1 to 21-N instead of the delay circuit 21. Compared to the signal output circuit 20, the signal output circuit 20C includes phase shifters 22-1 to 22-N instead of the phase shifter 22.

The first terminal 23a of the switch 23 is electrically coupled to the coupler 10. The second terminals 23b-1 to 23b-N of the switch 23 are electrically coupled to the delay circuits 21-1 to 21-N, respectively.

The switch 23 electrically couples the first terminal 23a and any of the second terminals 23b-1 to 23b-N. In the case illustrated in FIG. 8, the state where the switch 23 electrically couples the first terminal 23a and the second terminal 23b-1 is illustrated.

Because the operation of the delay circuits 21-1 to 21-N and the phase shifters 22-1 to 22-N is the same as or similar to the RF signal transmitting/receiving circuit 1B of the third embodiment, descriptions thereof are omitted.

In the fourth embodiment, a signal output by the switch 23 corresponds to an example of the "third signal" of the present disclosure. In the fourth embodiment, signals output by the delay circuits 21-1 to 21-N correspond to an example of the "fourth signal" of the present disclosure. In the fourth embodiment, signals output by the phase shifters 22-1 to 22-N correspond to an example of the "fifth signal" of the present disclosure. In the fourth embodiment, signals output by the attenuators 24-1 to 24-N correspond to an example of the "second signal" of the present disclosure.

SUMMARY

Like the RF signal transmitting/receiving circuit 1, the RF signal transmitting/receiving circuit 1C may suppress the RF transmission signal $RF_T$ mixed in the multiple RF reception signals $RF_{R-1}$ to $RF_{R-N}$. Accordingly, the RF signal transmitting/receiving circuit 1C may improve the reception sensitivity of the multiple RF reception signals $RF_{R-1}$ to $RF_{R-N}$.

Furthermore, compared to the RF signal transmitting/receiving circuit 1, the RF signal transmitting/receiving circuit 1C may adjust the delay time of each of the delay circuits 21-1 to 21-N. Accordingly, the RF signal transmitting/receiving circuit 1C may finely adjust the delay time for each band. Likewise, compared to the RF signal transmitting/receiving circuit 1, the RF signal transmitting/receiving circuit 1C may adjust the phase shift amount of each of the phase shifters 22-1 to 22-N. Accordingly, the RF signal transmitting/receiving circuit 1C may finely adjust the phase shift amount for each band. Therefore, the RF signal transmitting/receiving circuit 1C may finely adjust and suppress the RF transmission signal $RF_T$ mixed in the multiple RF reception signals $RF_{R-1}$ to $RF_{R-N}$ for each band.

Fifth Embodiment

Figure 9:
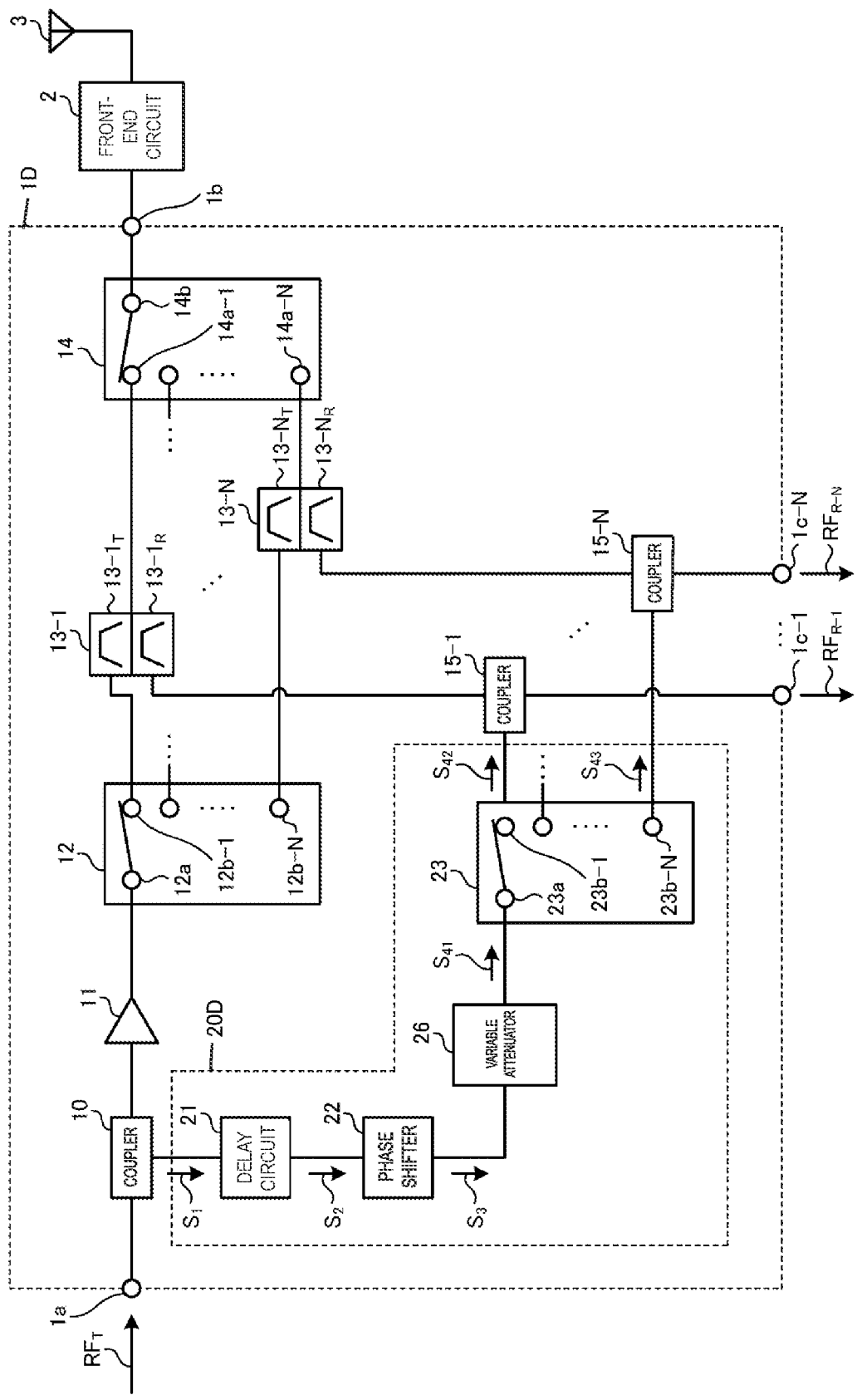
FIG. 9 is a diagram illustrating the configuration of an RF signal transmitting/receiving circuit according to a fifth embodiment.

FIG. 9 is a diagram illustrating the configuration of an RF signal transmitting/receiving circuit according to the fifth embodiment. Among the elements of an RF signal transmitting/receiving circuit 1D, the same elements as the RF signal transmitting/receiving circuits 1 to 1C of the first to fourth embodiments are given the same reference numerals, and descriptions thereof are omitted.

Compared to the RF signal transmitting/receiving circuit 1 (see FIGS. 1 and 2), the RF signal transmitting/receiving circuit 1D includes a signal output circuit 20D instead of the signal output circuit 20.

Compared to the signal output circuit 20, the signal output circuit 20D includes a variable attenuator 26 instead of the attenuators 24-1 to 24-N.

The variable attenuator 26 corresponds to an example of a "variable attenuation circuit" of the present disclosure.

The variable attenuator 26 is electrically coupled between the phase shifter 22 and the first terminal 23a of the switch 23.

The variable attenuator 26 outputs a signal $S_{41}$, which is obtained by attenuating the signal $S_3$ by a predetermined attenuation amount, to the first terminal 23a.

In the fifth embodiment, the signal $S_{41}$ corresponds to an example of the "fifth signal" of the present disclosure.

The attenuation amount of the variable attenuator 26 is, in the case illustrated in FIG. 9, a value obtained by subtracting the sum of the losses of the coupler 10, the delay circuit 21, the phase shifter 22, the switch 23, and the coupler 15-1 from the sum of the losses and gains of the coupler 10, the power amplifier circuit 11, the switch 12, the duplexer 13-1, and the coupler 15-1. Accordingly, in the transmission path of the RF reception signal $RF_{R-1}$ of the coupler 15-1, the power of the RF transmission signal $RF_T$ mixed in the RF reception signal $RF_{R-1}$ becomes the same as the power of a signal $S_{42}$ input from the switch 23 to the coupler 15-1.

In the fifth embodiment, the signal $S_{42}$ corresponds to an example of the "second signal" of the present disclosure.

Unlike FIG. 9, if the first terminal 23a and the second terminal 23b-N of the switch 23 are electrically coupled to each other, the attenuation amount of the variable attenuator 26 is a value obtained by subtracting the sum of the losses of the coupler 10, the delay circuit 21, the phase shifter 22, the switch 23, and the coupler 15-N from the sum of the losses and gains of the coupler 10, the power amplifier circuit 11, the switch 12, the duplexer 13-N, and the coupler 15-N. Accordingly, in the transmission path of the RF reception signal $RF_{R-N}$ of the coupler 15-N, the power of the RF transmission signal $RF_T$ mixed in the RF reception signal $RF_{R-N}$ becomes the same as the power of a signal $S_{43}$ input from the switch 23 to the coupler 15-N.

In the fifth embodiment, the signal $S_{43}$ corresponds to an example of the "second signal" of the present disclosure.

Like the RF signal transmitting/receiving circuit 1, the RF signal transmitting/receiving circuit 1D may suppress the RF transmission signal $RF_T$ mixed in the multiple RF reception signals $RF_{R-1}$ to $RF_{R-N}$. Accordingly, the RF signal transmitting/receiving circuit 1D may improve the reception sensitivity of the multiple RF reception signals $RF_{R-1}$ to $RF_{R-N}$.

Furthermore, compared to the RF signal transmitting/receiving circuit 1, the RF signal transmitting/receiving circuit 1D may reduce the number of attenuators from N to 1. Therefore, the size of the RF signal transmitting/receiving circuit 1D may be reduced.

Sixth Embodiment

Figure 10:
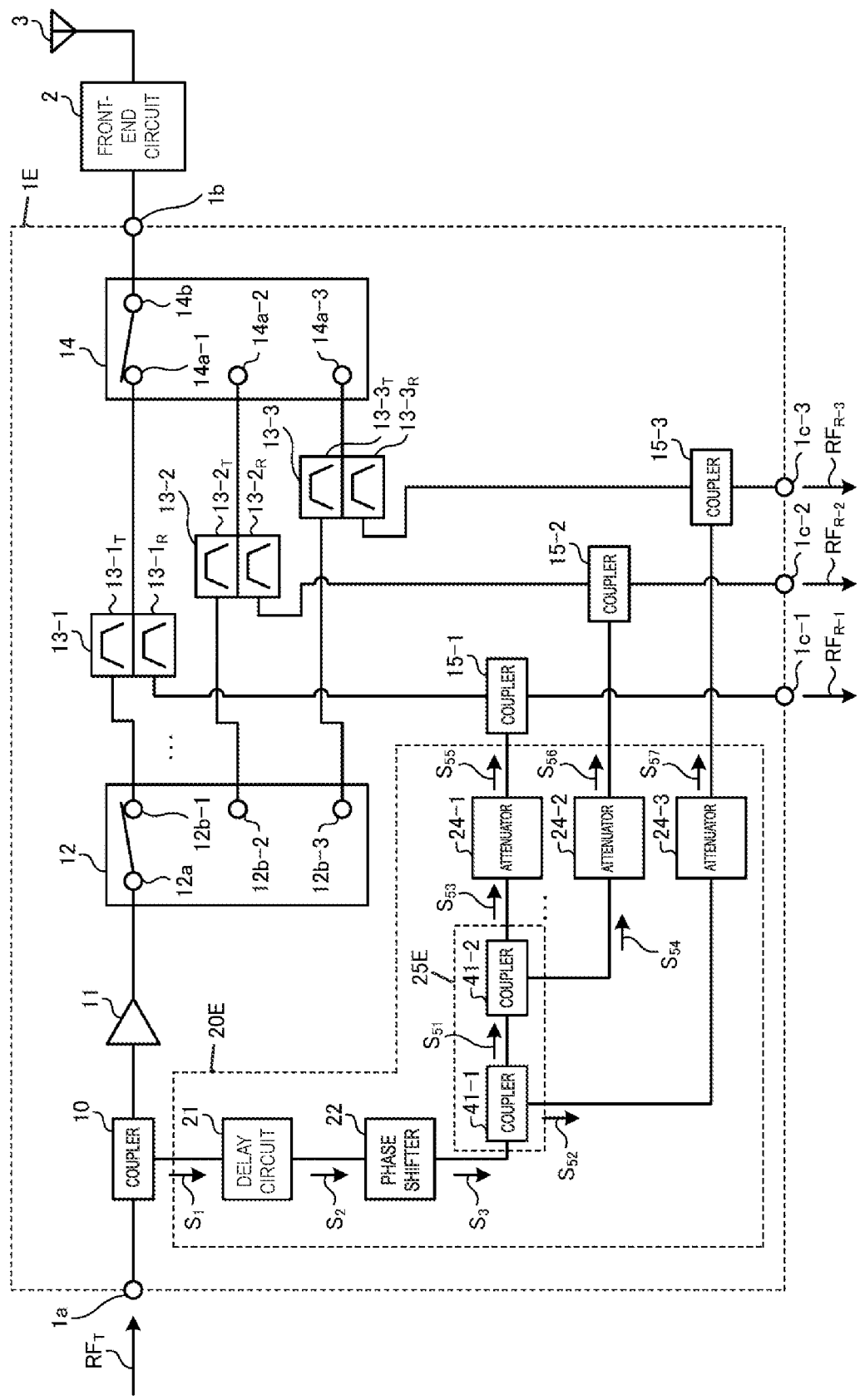
FIG. 10 is a diagram illustrating the configuration of an RF signal transmitting/receiving circuit according to a sixth embodiment.

FIG. 10 is a diagram illustrating the configuration of an RF signal transmitting/receiving circuit according to the sixth embodiment. Among the elements of an RF signal transmitting/receiving circuit 1E, the same elements as the RF signal transmitting/receiving circuits 1 to 1D of the first to fifth embodiments are given the same reference numerals, and descriptions thereof are omitted.

The RF signal transmitting/receiving circuit 1E of the sixth embodiment indicates the case where N=3.

Compared to the RF signal transmitting/receiving circuit 1A (see FIG. 6) in the case where N=2, the RF signal transmitting/receiving circuit 1E includes a signal output circuit 20E instead of the signal output circuit 20A.

Compared to the signal output circuit 20A, the signal output circuit 20E includes a distribution circuit 25E instead of the distribution circuit 25.

In the sixth embodiment, the distribution circuit 25E corresponds to an example of the "second distribution circuit" of the present disclosure.

The distribution circuit 25E divides the signal $S_3$, which is input from the phase shifter 22, into three, and outputs the three signals.

The distribution circuit 25E includes couplers 41-1 and 41-2.

The coupler 41-1 corresponds to an example of a "first coupler" of the present disclosure. The coupler 41-2 corresponds to an example of a "second coupler" of the present disclosure.

The coupler 41-1 divides the signal $S_3$, which is input from the phase shifter 22, into two, and outputs one signal $S_{51}$ to the coupler 41-2 and the other signal $S_{52}$ to the attenuator 24-3.

The coupler 41-2 divides the signal $S_{51}$, which is input from the coupler 41-1, into two, and outputs one signal $S_{53}$ to the attenuator 24-1 and the other signal $S_{54}$ to the attenuator 24-2.

In the sixth embodiment, the signals $S_{52}$ to $S_{54}$ correspond to an example of the "fifth signal" of the present disclosure.

The attenuator 24-1 outputs a signal $S_{55}$, which is obtained by attenuating the signal $S_{53}$ by a predetermined attenuation amount, to the coupler 15-1.

Note that the predetermined attenuation amount of the attenuator 24-1 is a value obtained by subtracting the sum of the losses of the coupler 10, the delay circuit 21, the phase shifter 22, and the couplers 41-1 and 41-2 from the sum of the losses and gains of the coupler 10, the power amplifier circuit 11, the switch 12, the duplexer 13-1, and the coupler 15-1. Accordingly, in the transmission path of the RF reception signal $RF_{R-1}$ of the coupler 15-1, the power of the RF transmission signal $RF_T$ mixed in the RF reception signal $RF_{R-1}$ becomes substantially the same as the power of the signal $S_{55}$ input from the attenuator 24-1 to the coupler 15-1.

The attenuator 24-2 outputs a signal $S_{56}$, which is obtained by attenuating the signal $S_{54}$ by a predetermined attenuation amount, to the coupler 15-2.

Note that the predetermined attenuation amount of the attenuator 24-2 is a value obtained by subtracting the sum of the losses of the coupler 10, the delay circuit 21, the phase shifter 22, and the couplers 41-1 and 41-2 from the sum of the losses and gains of the coupler 10, the power amplifier circuit 11, the switch 12, the duplexer 13-2, and the coupler 15-2. Accordingly, in the transmission path of the RF reception signal $RF_{R-2}$ of the coupler 15-2, the power of the RF transmission signal $RF_T$ mixed in the RF reception signal $RF_{R-2}$ becomes substantially the same as the power of the signal $S_{56}$ input from the attenuator 24-2 to the coupler 15-2.

The attenuator 24-3 outputs a signal $S_{57}$, which is obtained by attenuating the signal $S_{52}$ by a predetermined attenuation amount, to the coupler 15-3.

Note that the predetermined attenuation amount of the attenuator 24-3 is a value obtained by subtracting the sum of the losses of the coupler 10, the delay circuit 21, the phase shifter 22, and the coupler 41-1 from the sum of the losses and gains of the coupler 10, the power amplifier circuit 11, the switch 12, the duplexer 13-3, and the coupler 15-3. Accordingly, in the transmission path of the RF reception signal $RF_{R-3}$ of the coupler 15-3, the power of the RF transmission signal $RF_T$ mixed in the RF reception signal $RF_{R-3}$ becomes substantially the same as the power of the signal $S_{57}$ input from the attenuator 24-3 to the coupler 15-3.

Like the RF signal transmitting/receiving circuit 1, the RF signal transmitting/receiving circuit 1E may suppress the RF transmission signal $RF_T$ mixed in the multiple RF reception signals $RF_{R-1}$ to $RF_{R-3}$. Accordingly, the RF signal transmitting/receiving circuit 1E may improve the reception sensitivity of the multiple RF reception signals $RF_{R-1}$ to $RF_{R-3}$.

Furthermore, compared to the RF signal transmitting/receiving circuit 1, the RF signal transmitting/receiving circuit 1E includes no switch 23. Therefore, the cost of the RF signal transmitting/receiving circuit 1E may be reduced. In addition, because the control wiring of the switch 23 is optional in the RF signal transmitting/receiving circuit 1E, the size of the RF signal transmitting/receiving circuit 1E may be reduced.

Also, the RF signal transmitting/receiving circuit 1E uses no active component. Therefore, the RF signal transmitting/receiving circuit 1E may reduce the power consumption, and the clock noise of a control signal will not be mixed in an RF reception signal.

Although the case where N=2 has been described in the second embodiment and the case where N=3 has been described in the sixth embodiment, the present disclosure is not limited to these cases. The case where N is greater than or equal to 4 is also possible. In that case, three or more couplers may simply be connected in cascade.

Note that the above-described embodiments are intended to facilitate the understanding of the present disclosure and are not intended to limit the interpretation of the present disclosure. The present disclosure may be modified or improved without departing from the spirit thereof, and the present disclosure includes equivalents thereof.

While embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A radio-frequency signal transmitting/receiving circuit comprising:
    at least one power amplifier circuit configured to amplify and to output a radio-frequency transmission signal;
    a plurality of duplexers, each duplexer comprising a transmission filter that is configured to pass the radio-frequency transmission signal amplified by the power amplifier circuit, and a reception filter configured to pass a radio-frequency reception signal;
    a first distribution circuit configured to divide the radio-frequency transmission signal input to the power amplifier circuit and to output a first signal;
    a signal output circuit configured to output at least one second signal to a reception signal path, the radio-frequency reception signal of a corresponding duplexer having the radio-frequency transmission signal of the corresponding duplexer mixed therein passing through the reception signal path, and the at least one second signal having substantially a same delay, an inverted phase, and substantially a same power as the radio-frequency transmission signal mixed in the radio-frequency reception signal; and
    a plurality of coupling circuits, each coupling circuit configured to couple the at least one second signal to a corresponding radio-frequency reception signal.

2. The radio-frequency signal transmitting/receiving circuit according to claim 1, wherein the signal output circuit comprises:
    a delay circuit configured to delay the first signal by a predetermined delay time and to output a third signal;
    a phase shifter configured to shift a phase of the third signal by a predetermined phase shift amount and to output a fourth signal;
    a switch having a first terminal to which the fourth signal is input, the switch being configured to electrically couple the first terminal and at least one of a plurality of second terminals and to output a fifth signal from the electrically coupled at least one second terminal; and
    a plurality of attenuation circuits electrically coupled to the plurality of second terminals, respectively, each of the attenuation circuits being configured to attenuate the fifth signal by a predetermined attenuation amount and to output the second signal.

3. The radio-frequency signal transmitting/receiving circuit according to claim 1, wherein the signal output circuit comprises:
    a delay circuit configured to delay the first signal by a predetermined delay time and to output a third signal;
    a phase shifter configured to shift a phase of the third signal by a predetermined phase shift amount and to output a fourth signal;
    a second distribution circuit configured to divide the fourth signal into a plurality of fifth signals; and
    a plurality of attenuation circuits that are respectively configured to attenuate the fifth signals by a predetermined attenuation amount and to respectively output a plurality of the second signals.

4. The radio-frequency signal transmitting/receiving circuit according to claim 3, wherein the second distribution circuit comprises:
    a first coupler configured to divide the fourth signal into two additional signals; and
    a second coupler configured to divide one of the two signals into two signals.

5. The radio-frequency signal transmitting/receiving circuit according to claim 1, further comprising:
    a plurality of the power amplifier circuits being respectively configured to amplify and to output a plurality of the radio-frequency transmission signals; and
    a plurality of the distribution circuits being respectively configured to divide the radio-frequency transmission signals input to the power amplifier circuits and to respectively output a plurality of the first signals,
    wherein the signal output circuit comprises:
        a plurality of delay circuits that are respectively configured to delay the first signals by a predetermined delay time and to respectively output third signals;
        a plurality of phase shifters electrically coupled to the delay circuits, respectively, the phase shifters being configured to respectively shift a phase of the third signals by a predetermined phase shift amount and to respectively output fourth signals;
        a switch having first terminals to which the fourth signals are input, the switch being configured to electrically couple the first terminals and at least one of a plurality of second terminals and to output fifth signals respectively from the electrically coupled at least one second terminal; and
        a plurality of attenuation circuits electrically coupled to the second terminals, respectively, the attenuation circuits being respectively configured to attenuate the fifth signals by a predetermined attenuation amount and to respectively output a plurality of the second signals.

6. The radio-frequency signal transmitting/receiving circuit according to claim 1, wherein the signal output circuit comprises:
- a switch having a first terminal to which the first signal is input, the switch being configured to electrically couple the first terminal and at least one of a plurality of second terminals and to output a third signal from the electrically coupled at least one second terminal;
- a plurality of delay circuits electrically coupled to the second terminals, respectively, the delay circuits being configured to delay the third signal by a predetermined delay time and to output a plurality of fourth signals, respectively;
- a plurality of phase shifters electrically coupled to the delay circuits, respectively, the phase shifters being configured to respectively shift a phase of the fourth signals by a predetermined phase shift amount and to respectively output a plurality of fifth signals; and
- a plurality of attenuation circuits electrically coupled to the phase shifters, respectively, the attenuation circuits being configured to respectively attenuate the fifth signals by a predetermined attenuation amount and to respectively output a plurality of the second signals.

7. The radio-frequency signal transmitting/receiving circuit according to claim 1, wherein the signal output circuit comprises:
- a delay circuit configured to delay the first signal by a predetermined delay time and to output a third signal;
- a phase shifter configured to shift a phase of the third signal by a predetermined phase shift amount and to output a fourth signal;
- a variable attenuation circuit configured to attenuate the fourth signal by one of a plurality of predetermined attenuation amounts and to output a fifth signal; and
- a switch having a first terminal to which the fifth signal is input, the switch being configured to electrically couple the first terminal and at least one of a plurality of second terminals and to output the second signal from the electrically coupled at least one second terminal.

* * * * *